(12) United States Patent
    Koch et al.

(10) Patent No.: US 12,579,057 B2
(45) Date of Patent: Mar. 17, 2026

(54) COMPUTING ENVIRONMENT SOFTWARE APPLICATION TESTING

(71) Applicant: INTERNATIONAL BUSINESS MACHINES CORPORATION, Armonk, NY (US)

(72) Inventors: Fernando Luiz Koch, Greenwich, CT (US); Marco Aurelio Stelmar Netto, Sao Paulo (BR); David Jason Hunt, Kirkwood, MO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 946 days.

(21) Appl. No.: 17/456,714

(22) Filed: Nov. 29, 2021

(65) Prior Publication Data

US 2023/0168992 A1 Jun. 1, 2023

(51) Int. Cl.
    *G06F 11/3698* (2025.01)
    *G06F 11/3668* (2025.01)
            (Continued)

(52) U.S. Cl.
    CPC ...... *G06F 11/3698* (2025.01); *G06F 11/3688* (2013.01); *G06F 11/3692* (2013.01);
            (Continued)

(58) Field of Classification Search
    CPC ............. G06F 11/3698; G06F 11/3688; G06F 11/3692; G06N 20/00; H04L 41/5009; H04W 4/24
    See application file for complete search history.

(56) References Cited

U.S. PATENT DOCUMENTS 9,185,603 B1 11/2015 McCarthy
9,495,219 B2 11/2016 Cohn
            (Continued)

FOREIGN PATENT DOCUMENTS

WO      WO-2016192640 A1   12/2016
WO      WO-2017066936 A1   4/2017
            (Continued)

OTHER PUBLICATIONS

Caiazza, Chiara, et al. "MECPerf: An Application-level Tool for Estimating the Network Performance in Edge Computing Environments." 2020 IEEE 44th Annual Computers, Software, and Applications Conference (COMPSAC). IEEE, 2020. (Year: 2020).*
            (Continued)

*Primary Examiner* — Bradley A Teets
*Assistant Examiner* — Joanne G Macasiano
(74) *Attorney, Agent, or Firm* — Aaron Pontikos, Esq.; Heslin Rothenberg Farley & Mesiti P.C.; George S. Blasiak, Esq.

(57)                ABSTRACT

Methods, computer program products, and systems are presented. The method computer program products, and systems can include, for instance: testing a software application having instances that run on (a) a test computing environment and (b) a target computing environment, wherein each of the test computing environment and the target computing environment is provided by a mobile access edge computing (MEC) environment, wherein the testing includes varying a software application performance impacting parameter value impacting performance of an instance of the software application running on the test computing environment, and examining metrics data resulting from the varying the software application performance impacting parameter value; providing, in dependence on the metrics data, an action decision to adjust a software appli-
            (Continued)

cation performance impacting parameter value impacting performance of a software application instance of the software application running on the target computing environment; and adjusting the software application performance impacting parameter value impacting performance of the software application instance of the software application running on the target computing in accordance with the action decision.

21 Claims, 14 Drawing Sheets

(51) Int. Cl.
| | | |
|---|---|---|
| *G06N 20/00* | (2019.01) | |
| *H04L 41/5009* | (2022.01) | |
| *H04W 4/24* | (2024.01) | |

(52) U.S. Cl.
CPC ......... *G06N 20/00* (2019.01); *H04L 41/5009* (2013.01); *H04W 4/24* (2013.01)

(56) References Cited

U.S. PATENT DOCUMENTS

| | | | | |
|---|---|---|---|---|
| 10,489,284 | B1 * | 11/2019 | Saraf | .................... G06F 11/3698 |
| 10,567,291 | B2 | 2/2020 | Sabella et al. | |
| 10,779,178 | B1 | 9/2020 | Ramanathan et al. | |
| 10,972,575 | B2 | 4/2021 | Li et al. | |
| 11,019,077 | B2 | 5/2021 | Verma et al. | |
| 2012/0297251 | A1 * | 11/2012 | Masser | ............... G06F 11/3688 |
| | | | | 714/E11.029 |
| 2013/0036328 | A1 * | 2/2013 | Mutisya | ..................... G06F 8/65 |
| | | | | 717/172 |
| 2013/0283240 | A1 * | 10/2013 | Krajec | ................ G06F 11/3433 |
| | | | | 717/128 |
| 2014/0325481 | A1 * | 10/2014 | Pillai | ................... G06F 11/3003 |
| | | | | 717/124 |
| 2015/0009826 | A1 | 1/2015 | Ma et al. | |
| 2015/0222549 | A1 | 8/2015 | Kakadia et al. | |
| 2016/0321115 | A1 * | 11/2016 | Thorpe | ............... G06F 11/3409 |
| 2016/0321586 | A1 * | 11/2016 | Herzig | ................ G06F 11/3692 |
| 2017/0046254 | A1 * | 2/2017 | Buege | ................ G06F 11/3684 |
| 2017/0048876 | A1 | 2/2017 | Mahindra et al. | |
| 2017/0063596 | A1 | 3/2017 | Potkonjak | |
| 2017/0180459 | A1 * | 6/2017 | Frank | .................. H04L 41/0866 |
| 2019/0138934 | A1 | 5/2019 | Prakash et al. | |
| 2019/0306044 | A1 * | 10/2019 | Cohen | ..................... H04L 43/04 |
| 2020/0008044 | A1 | 1/2020 | Poornachandran et al. | |
| 2020/0160986 | A1 * | 5/2020 | Vegas Santiago | ....... G06N 5/01 |
| 2020/0374974 | A1 * | 11/2020 | Sun | ......................... H04L 41/20 |
| 2021/0027415 | A1 | 1/2021 | Khalid et al. | |
| 2021/0051177 | A1 | 2/2021 | White et al. | |
| 2021/0051762 | A1 | 2/2021 | Young et al. | |
| 2021/0083961 | A1 | 3/2021 | Polishchuk et al. | |
| 2021/0153041 | A1 | 5/2021 | Parvataneni et al. | |
| 2021/0176823 | A1 | 6/2021 | Mishra et al. | |
| 2022/0006857 | A1 * | 1/2022 | Sun | ......................... G06N 20/00 |
| 2022/0138081 | A1 * | 5/2022 | Varma | ................. G06F 11/3684 |
| | | | | 717/124 |

FOREIGN PATENT DOCUMENTS

| | | | |
|---|---|---|---|
| WO | WO-2017088905 | A1 | 6/2017 |
| WO | WO-2017175039 | A1 | 10/2017 |
| WO | WO-2017180093 | A1 | 10/2017 |
| WO | WO-2017187011 | A1 | 11/2017 |

OTHER PUBLICATIONS

Hussain, Ishtiaque, Qiang Duan, and Tiffany Zhong. "Service performance tests on the mobile edge computing platform: challenges and opportunities." INFORMS International Conference on Service Science. Cham: Springer International Publishing, 2019. (Year: 2019).*

Jha, Devki Nandan, et al. "IoTSim-Edge: a simulation framework for modeling the behavior of Internet of Things and edge computing environments." Software: Practice and Experience 50.6 (2020): 844-867. (Year: 2020).*

Mi et al.; "Demonstrating Immersive Media Delivery on 5G Broadcast and Multicast Testing Networks", TBC IEEE Transactions on, vol. 66, Iss. 2, pp. 555-570, Jun. 2020.

Al Ridhawi et al.; "A Collaborative Mobile Edge Computing and User Solution for Service Composition in 5G Systems",ETT Transactions on,vol. 19,Iss. 11,pp. 1-19,Nov. 2018.

Nunna et al.; "Enabling Real-Time Context-Aware Collaboration Through 5G and Mobile Edge Computing", ITNG IEEE 12th Inter. Conf. on, pp. 601-605, Apr. 13-15, 2015.

Han et al.; "Context-Awareness Enhances 5G Multi-Access Edge Computing Reliability", IEEE Access, vol. 7, pp. 21290-21299, Feb. 27, 2019.

Sabella et al.; "Designing the 5G network Infrastructure: A Flexible and Reconfigurable . . . Information", EURASIP Journal on, Article 199, pp. 1-16, Aug. 13, 2018.

* cited by examiner

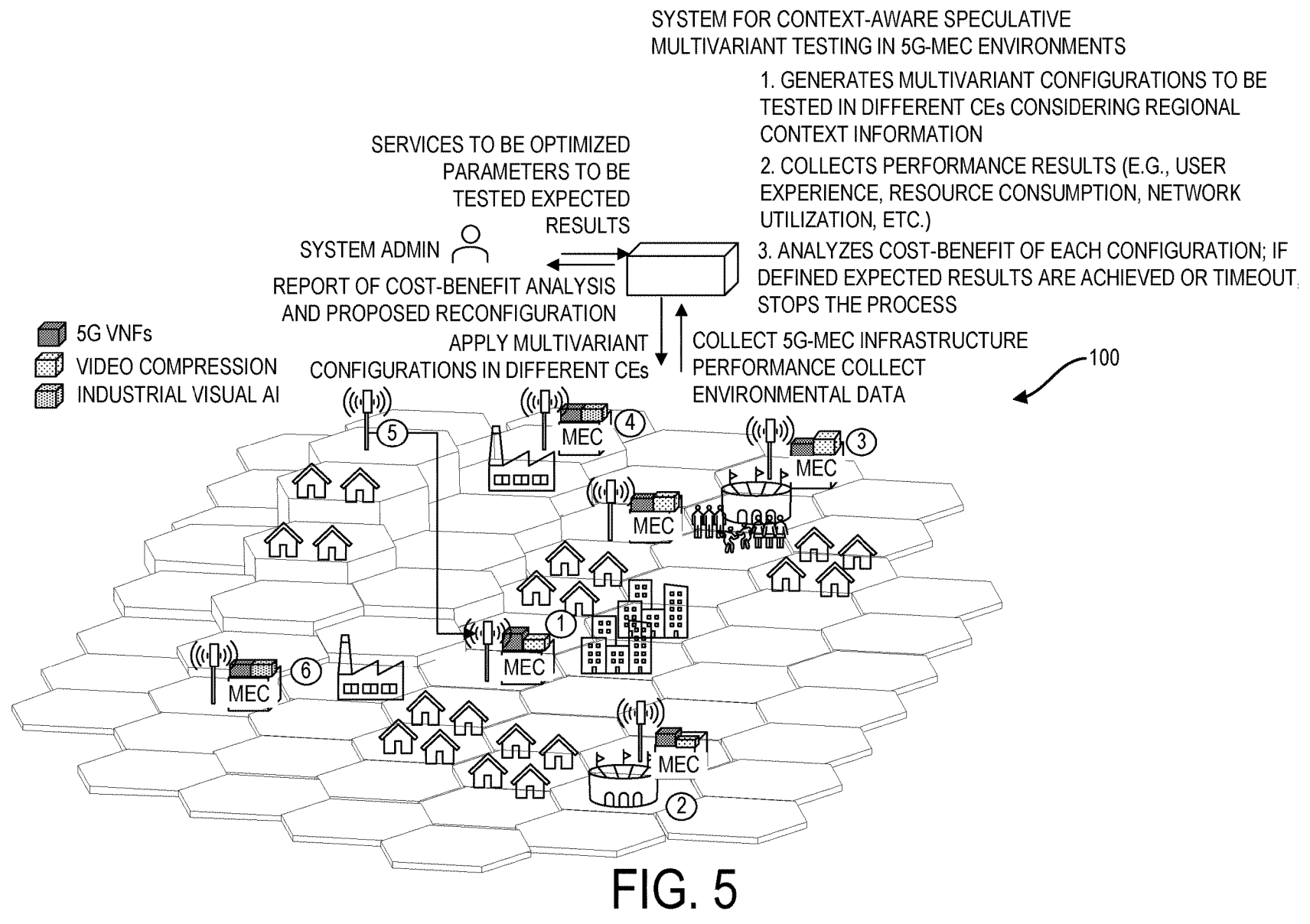

SYSTEM FOR CONTEXT-AWARE SPECULATIVE
MULTIVARIANT TESTING IN 5G-MEC ENVIRONMENTS

1. GENERATES MULTIVARIANT CONFIGURATIONS TO BE
TESTED IN DIFFERENT CEs CONSIDERING REGIONAL
CONTEXT INFORMATION

2. COLLECTS PERFORMANCE RESULTS (E.G., USER
EXPERIENCE, RESOURCE CONSUMPTION, NETWORK
UTILIZATION, ETC.)

3. ANALYZES COST-BENEFIT OF EACH CONFIGURATION; IF
DEFINED EXPECTED RESULTS ARE ACHIEVED OR TIMEOUT
STOPS THE PROCESS

COLLECT 5G-MEC INFRASTRUCTURE
PERFORMANCE COLLECT
ENVIRONMENTAL DATA

SERVICES TO BE OPTIMIZED
PARAMETERS TO BE
TESTED EXPECTED
RESULTS

SYSTEM ADMIN
REPORT OF COST-BENEFIT ANALYSIS
AND PROPOSED RECONFIGURATION

APPLY MULTIVARIANT
CONFIGURATIONS IN DIFFERENT CEs

100

5G VNFs
VIDEO COMPRESSION
INDUSTRIAL VISUAL AI

MEC

FIG. 5

METHOD TO GENERATE SPECULATIVE CONTEXTUALIZED
MULTIVARIANT CONFIGURATION ADJUSTMENTS

SELECTED MULTI-VARIATION CONFIGURATION
ADJUSTMENTS PER CE

METHOD TO ASSESS COST-BENEFIT BALANCE FOR MULTIVARIANT
CONFIGURATIONS IN DIVERSE CONTEXTS

COMPUTING ENVIRONMENT SOFTWARE APPLICATION TESTING

BACKGROUND

Embodiments herein relate generally to adjusting a software application performance impacting parameter value impacting performance of a software application running within a computing environment, such as a multi-access edge computing environment.

A network service can include a software application running at the network software application layer and above that provides data storage, manipulation, presentation, communication or other capability which is often implemented using a client-server architecture based on software application layer network protocols. Each network service is usually provided by a server component running on one or more computer and accessed via a network by client components running on other devices. However, client and server components may both run on the same machine. In addition, a dedicated server computer may offer multiple network services concurrently.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: testing a software application having instances that run on (a) a test computing environment and (b) a target computing environment, wherein each of the test computing environment and the target computing environment is provided by a mobile access edge computing (MEC) environment, wherein the testing includes varying a software application parameter value impacting performance of an instance of the software application running on the test computing environment, and examining metrics data resulting from the varying the software application performance impacting parameter value; providing, in dependence on the metrics data, an action decision to adjust a software application performance impacting parameter value impacting performance of a software application instance of the software application running on the target computing environment; and adjusting the software application performance impacting parameter value impacting performance of the software application instance of the software application running on the target computing in accordance with the action decision.

In another aspect, a computer program product can be provided. The computer program product can include a computer readable storage medium readable by one or more processing circuit and storing instructions for execution by one or more processor for performing a method. The method can include, for example: testing a software application having instances that run on (a) a test computing environment and (b) a target computing environment, wherein each of the test computing environment and the target computing environment is provided by a mobile access edge computing (MEC) environment, wherein the testing includes varying a software application parameter value impacting performance of an instance of the software application running on the test computing environment, and examining metrics data resulting from the varying the software application performance impacting parameter value; providing, in dependence on the metrics data, an action decision to adjust a software application performance impacting parameter value impacting performance of a software application instance of the software application running on the target computing environment; and adjusting the software application performance impacting parameter value impacting performance of the software application instance of the software application running on the target computing in accordance with the action decision.

In a further aspect, a system can be provided. The system can include, for example a memory. In addition, the system can include one or more processor in communication with the memory. Further, the system can include program instructions executable by the one or more processor via the memory to perform a method. The method can include, for example: testing a software application having instances that run on (a) a test computing environment and (b) a target computing environment, wherein each of the test computing environment and the target computing environment is provided by a mobile access edge computing (MEC) environment, wherein the testing includes varying a software application parameter value impacting performance of an instance of the software application running on the test computing environment, and examining metrics data resulting from the varying the software application performance impacting parameter value; providing, in dependence on the metrics data, an action decision to adjust a software application performance impacting parameter value impacting performance of a software application instance of the software application running on the target computing environment; and adjusting the software application performance impacting parameter value impacting performance of the software application instance of the software application running on the target computing in accordance with the action decision.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6 is a schematic functional view illustrating the system as set forth in FIG. 1A and FIG. 1B according to one embodiment;

DETAILED DESCRIPTION

Figure 1A:
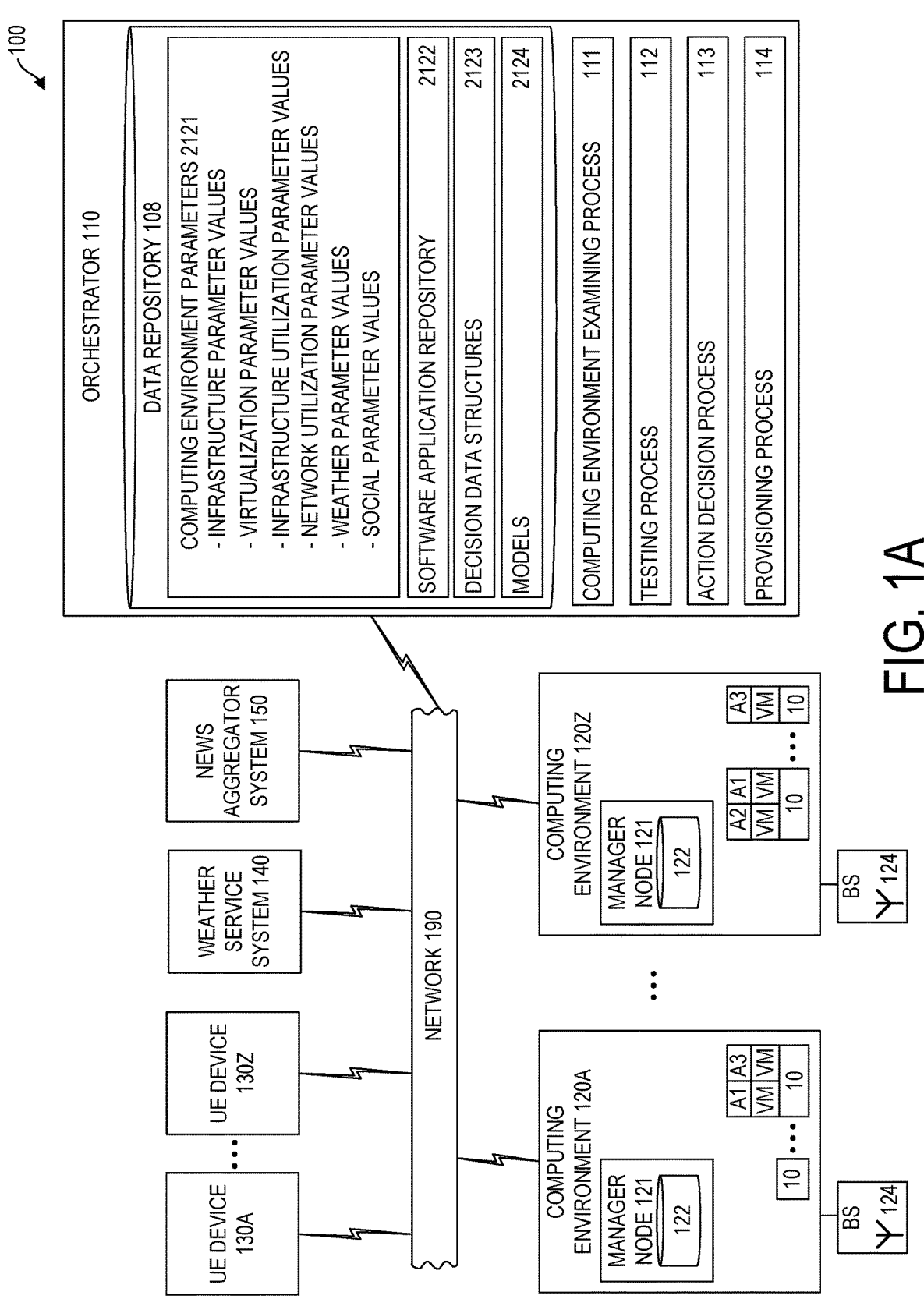
FIG. 1A depicts a system having an orchestrator plurality of computing environments, a plurality of UE devices, a weather service system, and a news aggregator system according to one embodiment.

System 100 for improving performance of edge network hosted software applications is shown in FIG. 1. System 100 can include orchestrator 110 having an associated data repository 108, computing environments 120A-120Z, user equipment (UE) devices 130A-130Z, weather service system 140, and news aggregator system 150. Orchestrator 110, computing environments 120A-120Z, and UE devices 130A-130Z, weather service system 140, and news aggregator system 150, can be in communication with one another via network 190. Network 190 can be a physical network and/or a virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network. In one embodiment, computing environments 120A-120Z can be edge network computing environments that are disposed within an edge network.

In one embodiment, computing environments 120A-120Z can be edge network computing environments disposed within an edge network. In one embodiment, computing environments of computing environments 120A-120Z can be base station-associated computing environments that are associated to one or more base station 124, e.g., by being disposed within a threshold number of hops from base station, or by being within a common limited area geofence within a based station. In one embodiment, a respective computing environment, e.g., computing environment 120A, can be associated to one or more base station 124 as shown in FIG. 1. A respective base station of one or more base station 124 can be characterized by an antenna array, e.g., mounted on a base station tower, and one or more base station computing node connected to the antenna array. The antenna array can include one or more antenna. The one or more base station computing node can be configured as, e.g., a nodeB computing node, an eNodeB computing node, or a New Radio (NR) computing node. By their being disposed within an edge network, and/or by their being associated to one or more base station, computing environments 120A-120Z can be regarded to be multi-access edge (MEC) computing environments.

Respective computing environments of computing environments 120A-120Z can include a manager node 121 having an associated data repository 122, and a plurality of computing nodes which can be provided by physical computing nodes. The physical computing nodes can host, e.g., one or more virtual machine, which one or more virtual machines can host software applications.

In one embodiment, orchestrator 110 can be external to weather service system 140, news aggregator system 150 and to each of the one or more client computer device 130A-130Z. In one embodiment, orchestrator 110 can be co-located with one or more of weather service system 140, news aggregator system 150, and to a client computer device of client computer device 130A-130Z.

Embodiments herein recognize that edge network disposed computing environments, such as computing environments 120A-120Z, can run a set of common software applications. Common software applications can include, e.g., image recognition software applications, artificial intelligence (AI) support software applications, and virtual network function (VNF) software applications. Certain software applications running within computing environments 120A-120Z can be types of software applications requiring low latency performance demanded by UE device clients being serviced by the running of the software applications.

UE devices 130A-130Z can include client computing devices being serviced by software applications running within computing environments 120A-120Z. UE devices 130A-130Z can include, e.g., personal UE devices associated to customer users. UE devices 130A-130Z can include enterprise IoT devices. UE devices 130A-130Z can include UE devices associated to agent users of enterprises that own, operate, and/or control infrastructure of computing environments 120A-120Z.

Weather service system 140 can be configured to provide weather data with respect to an area being serviced by system 100. Weather data can include, e.g., historical temperature data, precipitation data, wind data and weather event data. Weather data can include, e.g., current temperature data, precipitation data, wind data, and weather event data. Weather data can include, e.g., forecast temperature data, precipitation data, wind data, and weather event data. Weather events can include, e.g., storms including hurricanes, tornados, fog formations, heat waves, and cold waves. Weather service system 140 can store weather data associated to different regions of an area being serviced by system 100.

News aggregator system 150 can be provided by, e.g., a server with appropriate software for aggregating syndicated web content such as online new papers, blogs, or podcasts in a central location for easy access. News aggregator system 150 can include a rich site summary (RSS) synchronized subscription system. RSS uses extensible markup language (XML) to structure pieces of information to be aggregated in a feed reader. Distributed updates can include, e.g., journal tables of contents, podcasts, videos, and news items. News aggregator system 150 can include human selected and entered content as well as automatically selected content, selected with use of auto-selection algorithms. Rich site summary (RSS) feeds can include text and metadata that specifies such information as publishing date and author name.

Orchestrator 110 can be configured to obtain computing environment characterizing parameter values characterizing the various computing environments of computing environments 120A-120Z. Orchestrator 110 can also be configured to use the described obtained computing environment parameter values to identify computing environments having a threshold level of similarity with a target computing environment targeted for software application parameter adjustment.

Orchestrator 110 can further be configured to use a result of the described similarity analysis to perform software application testing. Software application testing can include variance testing in which a software application performance impacting parameter value impacting performance of a software application is varied. Orchestrator 110 can return an action decision in dependence on a test result resulting from the software application testing. The action decision can include an action decision to adjust one or more software application performance impacting parameter value impacting performance of a target software application.

Orchestrator 110 in data repository 108 can store various data. In computing environment characterizing parameters area 2121, data repository 108 can store, e.g., infrastructure parameter values, virtualization parameter values, infrastructure utilization parameter values, network utilization parameters values, weather parameter values, and social parameter values. The described parameter values can characterize the various computing environments of computing environments 120A-120Z.

Infrastructure parameter values can include such parameter values as numbers of computing nodes 10 provided by physical computing nodes, number of base stations serviced, numbers of clusters, numbers of computing nodes per cluster, computing node (CPU) capacity, memory capacity, storage capacity, and network capacity (bandwidth). Computing node capacity, memory capacity, and storage capacity can be expressed in terms of aggregate computing environment capacity or can be reported on a per computing node basis.

Virtualization parameter values can include, e.g., numbers of virtual machines and/or resource provisioning parameter values associated to the various virtual machines. Virtual machines herein can include, e.g., hypervisor-based virtual machines or container-based virtual machines.

Infrastructure utilization parameters can include, e.g., CPU utilization parameters, memory utilization parameters, and/or storage utilization parameters. It will be understood that infrastructure availability parameter values can be derived at any time with use of the reported utilization parameters based on the contemporaneously reported capacity parameter values.

Network utilization parameters can include, e.g., throughput parameter values expressed, e.g., in terms of bits per second (BPS), response time parameter values, latency parameter values, and packet loss (error rate) parameter values, concurrent users parameter values, which specifies the number of active users at a given time, and/or a requests per second (RPS) parameter value which specifies a number of requests for a digital asset received over time. It will be understood that network availability parameter values can be derived at any time with use of the reported utilization parameters based on the contemporaneously reported capacity parameter values, including network capacity parameter values.

Weather parameter values can include, e.g., weather parameter values specifying temperature and/or precipitation parameter values associated to a certain computing environment, e.g., mapping to the same geospatial area of a computing environment.

Social parameter values can include, e.g., data specifying entertainment events within a geospatial area of a computing environment. In some use case scenarios, it is anticipated that a computing environment of computing environments 120A-120Z can map to an events venue, e.g., a stadium, conference center, convention center, or the like. Respective computing environments of computing environments 120A-120Z, by manager node 121, can be configured to poll available news aggregator resources such as news aggregator system 150 to ascertain the timing of such events and store data of such events into respective data repositories 122 of respective manager nodes 121.

Social parameter values can also include, e.g., parameter values indicating user experience satisfaction levels. Orchestrator 110 can be configured to present web-based user interface forms that are displayed on displays of UE devices 130A-130Z, that permit users to specify their level of satisfaction with an application based service running within a computing environment, In another aspect, orchestrator 110 can be configured to derive user satisfaction parameter values by examination of network utilization parameter values. For example, orchestrator 110 can monitor throughput in bits per second associated to a connection to a certain user, and can record an increase in the throughput of the connection as increase in satisfaction level of the user and as an indication of positive satisfaction of the user.

Software application repository 2122 of data repository 108 can store software application code defining one or more software application that can be a common software application distributed amongst computing environments 120A-120Z. Common software applications can include, e.g., artificial intelligence (AI) software applications, virtual network function (VNF) software applications, video analytics software applications (quality monitoring, intrusion detection, worker safety, theft detection, customer traffic patterns), energy monitoring software applications, AR/VR/XR software applications (gaming, augmented maintenance, worker training), operations efficiency and optimization software applications, acoustic monitoring software applications, network monitoring software applications (performance, quality, fault), remote inspection software applications, content caching and distribution software applications, and/or video streaming/distribution software applications. Such software applications can be running on computing environments of computing environments 120A-120Z that are collocated with, e.g., smart buildings, smart homes, agriculture facilities, health facilities, manufacturing facilities, smart cities, oil and gas facilities, connected or self-driving cars, and/or AI virtual assistants.

Software application repository 2122 can store instances of common software applications distributed amongst computing environments 120A-120Z.

Orchestrator 110 in decision data structures area 2123 can store decision data structures, e.g., decision tables and/or decision trees for return of action decisions by orchestrator 110. Orchestrator 110 in models area 2124 can store predictive models for use in return of action decisions by orchestrator 110. Predictive models can include, e.g., trained predictive models trained by machine learning training.

Orchestrator 110 can run various processes. Orchestrator 110 can run, e.g., computing environment examining process 111, testing process 112, action decision process 113, and provisioning process 114.

Orchestrator 110 running computing environment examining process 111 can include orchestrator 110 obtaining computing environment characterizing parameter values from computing environments 120A-120Z and examining such computing environment parameter values for determination of a level of similarity between different ones of computing environments 120A-120Z. Orchestrator 110 running computing environment examining process 111 can examine computing environment characterizing values to identify computing environments of computing environments 120A-120Z that exhibit a threshold level of similarity. In one embodiment, orchestrator 110 running computing environment examining process 111 can include orchestrator 110 performing clustering analysis to identify a level of similarity between computing environments of computing environments 120A-120Z.

Orchestrator 110 running testing process 112 can include orchestrator 110 performing testing of an identified target software application. Orchestrator 110 running testing process 112 can include orchestrator 110 testing a target software application running on a target computing environment on a test computing environment. Orchestrator 110 running testing process 112 to perform a software test can include orchestrator 110 varying a software application performance impacting parameter value impacting the performance of the software application on the test computing environment. Software application parameters that can be varied can include, e.g., varying software application performance impacting parameter values impacting performance of the test software application running on the test computing environment of computing environments 120A-120Z.

Software application performance impacting parameter values can include, e.g., infrastructure software application performance impacting parameter values and virtualization software application parameters. Infrastructure software application performance impacting parameter values can include, e.g., CPU capacity software application parameters that specify the CPU capacity of a hosting computing node hosting a software application, cluster software application performance impacting parameter values that specify attributes of a cluster having a computing node hosting the software application, memory software application performance impacting parameter values specifying, e.g., type of memory and amount of memory, storage software application performance impacting parameter values specifying, e.g., type of storage including amounts and levels of caches.

Virtualization parameter values can include parameter values specifying, e.g., type of virtual machine, i.e., whether the virtual machine is a hypervisor-based virtual machine are a container-based virtual machine, and resource provisioning parameter values specifying resource provisioning attributes associated to the virtual machine. Resource provisioning parameter values can include, e.g., CPU resource provisioning parameter values specifying CPU resource allocations to a virtual machine, memory resource provisioning parameter values specifying memory resource allocations to a virtual machine, and/or storage resource provisioning parameter values specifying storage resource allocations to a virtual machine.

Orchestrator 110 performing testing process 112 can include orchestrator 110 adjusting software application performance impacting parameter values and analyzing return metrics parameter values resulting from the adjusted software application performance impacting parameter values. Return metrics parameter values can include metrics herein referenced with respect to the described infrastructure utilization parameter values and network utilization parameter values set forth herein. Orchestrator 110 running testing process 112 can vary a software application performance impacting parameter value and can examine a test result resulting from the software application performance impacting parameter value variation.

Orchestrator 110 running action decision process 113 can include orchestrator 110 returning an action decision in dependence on the result of the testing performed by testing process 112. In one embodiment, orchestrator 110 can return an action decision to adjust a software application performance impacting parameter value associated to a target software application of a target computing environment of computing environments 120A-120Z in dependence on the result of a test performed by testing process 112, in which the testing has comprised varying of a software application performance impacting parameter value impacting the performance of a software application running within a test environment.

Orchestrator 110 running provisioning process 114 can include orchestrator 110 implementing the action decision returned by action decision process 113. Orchestrator 110 running provisioning process 114 can include orchestrator 110 sending provisioning command data to a target computing environment. The provisioning command data can specify the adjusting of one or more software application performance impacting parameter value impacting the performance of a target software application running within a target computing environment of computing environments 120A-120Z.

Figure 1B:
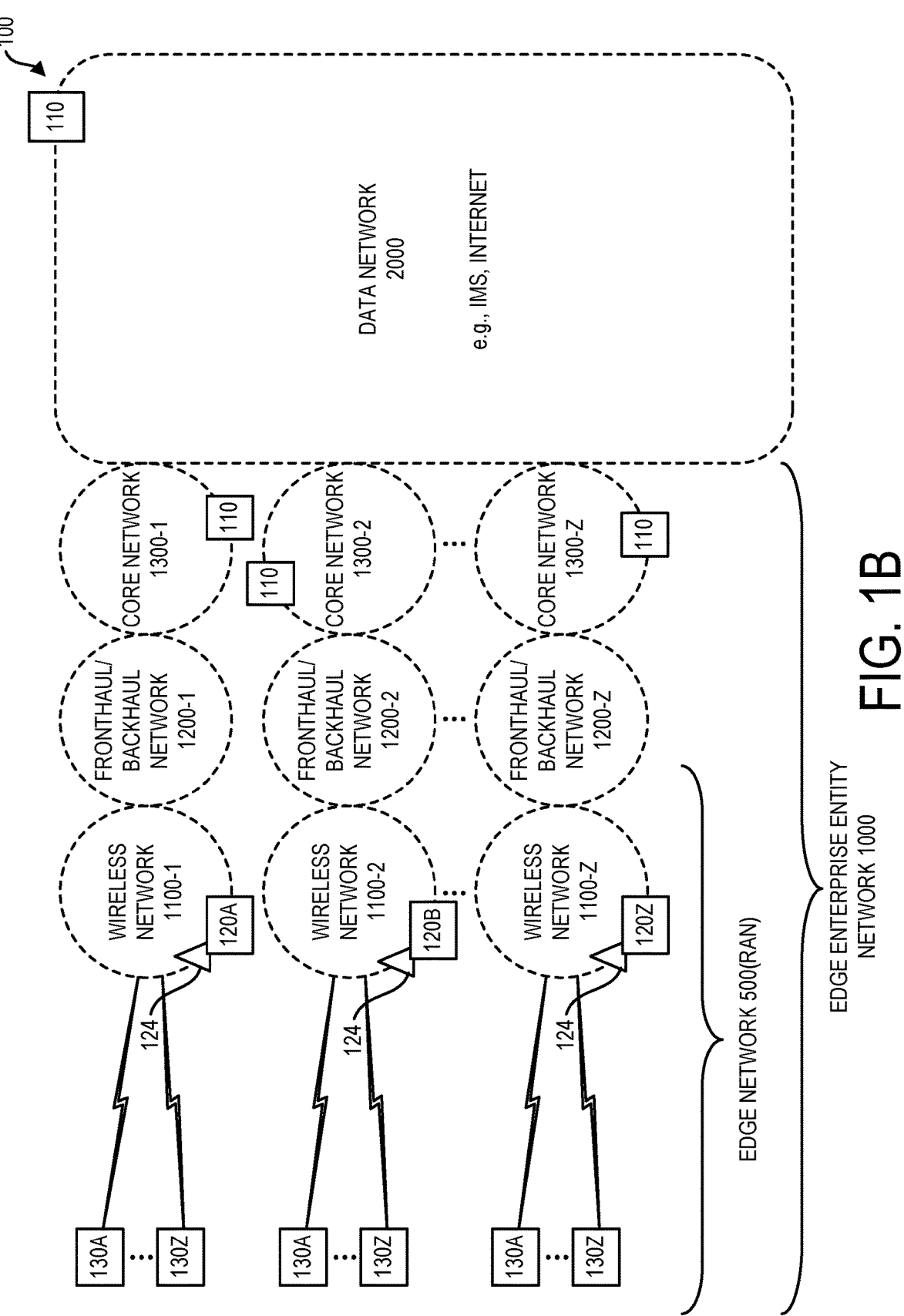
FIG. 1B depicts a physical network view of the system of FIG. 1A, according to one embodiment.

FIG. 1B depicts a physical network implementation view of system 100. System 100 can include UE devices 130A-130Z in communication with data network 2000 via a plurality of edge enterprise entity networks 1000. System 100, as set forth herein, including in reference to FIG. 1A and FIG. 2, can be compliant with Fifth Generation (5G) technologies, including the New Radio (NR) standard, documents of 3GPP TS 28.530 V15.1.0 Release 15 by the $3^{rd}$ Generation Partnership Project (3GPP), and the technical reports of Release 16 of the 3GPP (3GPP Release 16 reports).

Respective edge enterprise entity networks 1000 can include edge infrastructure owned, operated, and/or controlled by one or more edge enterprise entity distributed throughout different geospatial areas. In one embodiment, a certain edge enterprise entity can own, operate, and/or control the edge network infrastructure comprising wireless network 1100-1, fronthaul/backhaul network 1200-1, and core network 1300-1 in a first geospatial region. The certain edge enterprise can own, operate, and/or control the edge infrastructure comprising wireless network 1100-2, fronthaul/backhaul network 1200-2, and core network 1300-2 on a second geospatial region. The certain edge enterprise entity can own, operate, and/or control the edge infrastructure comprising wireless network 1100-Z, fronthaul/backhaul network 1200-Z, and core network 1300-Z in a third geospatial region. In another example, the different edge enterprise entity networks 1000 can be owned, operated, or controlled by different edge enterprise entities. Different respective ones of the edge enterprise entities can be telecommunications network providers which are sometimes referred to as communication service providers (edge enterprise entity CSPs).

In the described embodiment of FIG. 1B, the combination of a wireless network and a fronthaul network can define edge network 500 provided by a radio access network (RAN). Edge network 500 can define edge infrastructure. The depicted RANs provide access from UE devices 130A-130Z to respective core networks. In an alternative embodiment, one or more of edge networks 500 can be provided by a content delivery network (CDN).

Each of the different UE devices 130A-130Z can be associated to a different user. A UE device of UE devices 130A-130Z in one embodiment can be a computing node device provided by a client computer, e.g., a mobile device, e.g., a smartphone or tablet, a laptop, smartwatch, or PC that runs one or more program that facilitates access to services by one or more service provider. A UE device of UE devices 130A-130Z can alternatively be provided by, e.g., an internet of things (IoT) sensing device.

Embodiments herein recognize that hosting service functions on one or more computing node within an edge enterprise entity network 1000 can provide various advantages including latency advantages for speed of service delivery to end users at UE devices 130A-130Z. Edge enterprise entity hosted service functions can be hosted, e.g., within edge network 500 or otherwise within edge enterprise entity network 1000.

Data network 2000 can include, e.g., an IP multimedia sub-system (IMS) and/or "the internet" which can be regarded as the network of networks that consist of private, public, academic, business, and government networks of local to global scope linked by a broad array of electronic, wireless, and optical networking technologies. Data network 2000 can include, e.g., a plurality of non-edge data centers. Such data centers can include private enterprise data centers as well as multi-tenancy data centers provided by IT enterprises that provide for hosting of service functions developed by a plurality of different enterprise entities.

Orchestrator 110, in one embodiment, can be disposed in data network 2000. In one embodiment, orchestrator 110 can be iteratively replicated from data network 2000 into respective ones of core network 1300-1, 1300-2, and 1300-Z.

As shown in FIG. 1B, the different computing environments of computing environments 120A-120Z can be disposed in geospatially differentiated regions over an area. In one example, the different geospatial regions can be spaced apart different geospatial regions. The different geospatial regions defined by a footprint of a respective computing environment can be in different e.g., counties, cities, states, and/or different countries. The different computing environments of computing environments 120A-120Z can each respectively be disposed in a different edge network 500, and particularly each respective computing environment 120A-120Z can be disposed in a different wireless network associated to a particular edge network. The different geospatial regions can include geospatial regions that are located, e.g., about 1K apart or more, about 10K apart or more, about 100K apart or more, or about 1000K or more (e.g., East Coast and West Coast in the United States).

Figure 2:
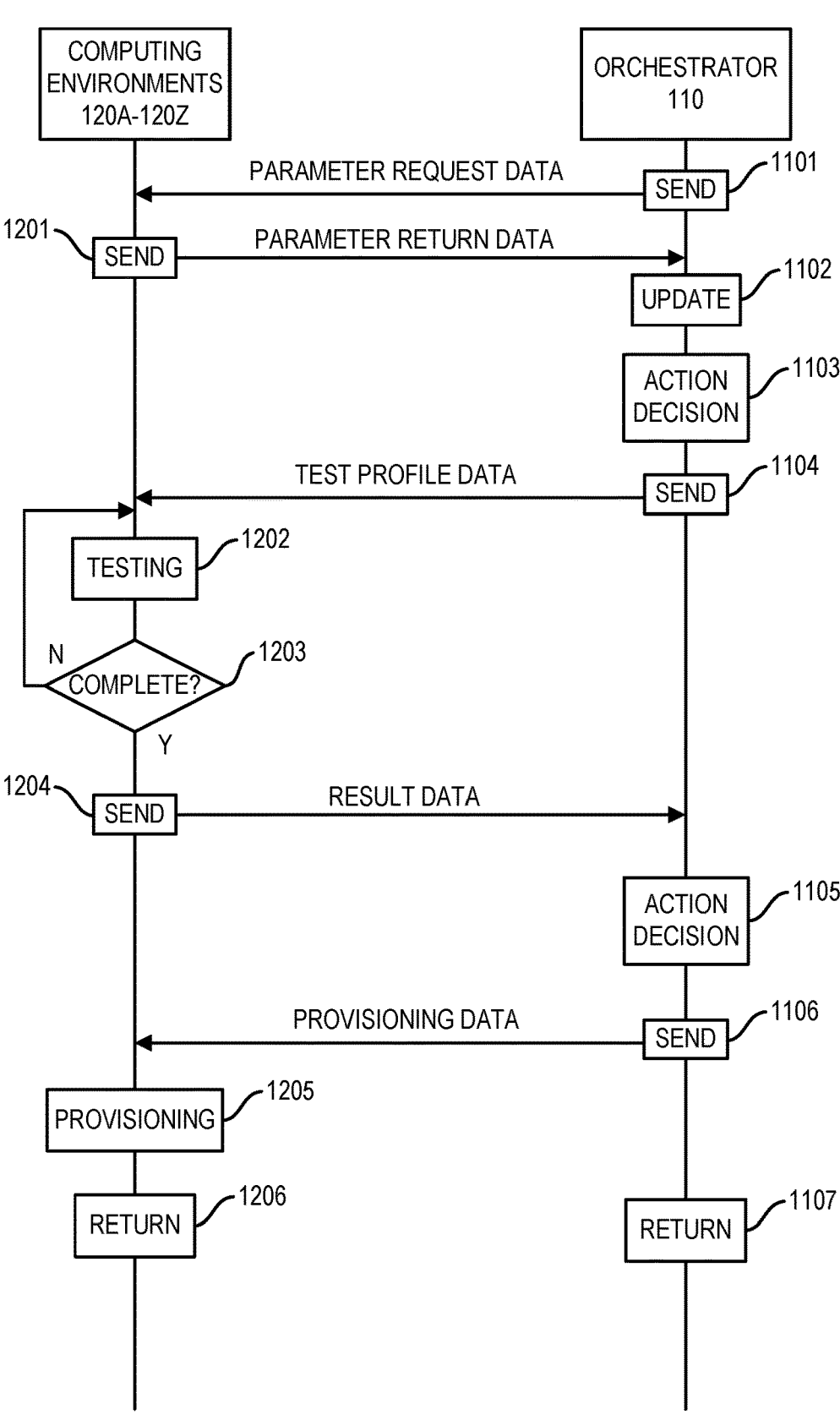
FIG. 2 is a flowchart illustrating a method for performance of an orchestrator interoperating with a plurality of computing environments according to one embodiment.

A method for performance by orchestrator 110 interoperating with computing environments 120A-120Z is set forth in reference to the flowchart of FIG. 2. At block 1101, orchestrator 110 can be sending parameter request data to computing environments 120A-120Z. The parameter request data can include request data to request computing environment characterizing parameter values from computing environments 120A-120Z. The request data can specify requests for the parameter values described with reference to computing environment parameters area 2121 of data repository 108 of orchestrator 110.

At block 1201, computing environments 120A-120Z can responsively send parameter value return data to orchestrator 110, and in response to receipt of the parameter value return data, orchestrator 110 at update block 1102 can update data repository 108 to include the computing environment characterizing data, which computing environment characterizing data can include the data described with reference to computing environment parameters area 2121.

Computing environments 120A-120Z can include appropriate restful software application program interfaces (APIs) to facilitate the data transfer described with request to send block 1101 and send block 1201.

In response to receipt of the parameter return data sent at block 1201, orchestrator 110 at update block 1102 can update computing environment parameters area 2121. At update block 1102, orchestrator 110 can also be requesting and receiving weather data from weather service system 140 for storage into computing environment parameters area 2121. At update block 1102, orchestrator 110 can also be requesting and receiving social events data from news aggregator system 150 for storage into computing environment parameters area 2121. Orchestrator 110 can, in addition or alternatively, be receiving weather data and/or social events data from respective manager nodes 122 of respective computing environments 120A-120Z.

Respective manager nodes 121 of respective computing environments 120A-120Z can run processes for collection of computing environment characterizing parameter values including infrastructure utilization parameter values and network utilization parameter values. For collection of infrastructure utilization parameter values and network utilization parameter values, manager node 121 can run a data collection process in which manager node 121 requests and receives metrics data from agent programs running, e.g., within an operating system running on computing node 10 within the guest operating system of a virtual machine (VM) running on a computing node and/or an agent program running within a software application, e.g., software application A1-A3, as set forth herein.

Return infrastructure utilization parameter values and network utilization parameter values can be stored in data repository 122 associated to manager node 121. Manager node 121 of respective computing environment 120A-120Z can also be in communication with weather service system 150 for return of weather forecast events which could impact performance of a software application running within a computing environment 120A.

The return data returned from use aggregator system 140 and weather service system 150, like the described infrastructure utilization data parameters and network utilization parameters, can be stored data in data repository 122 associated to manager node 121. Manager node 121 in data repository 122 can also maintain a registry that specifies infrastructure parameter values and virtualization parameter values characterizing computing environment 120A. The described computing environment characterizing values stored in manager node 121 can be returned associated to a certain one computing environment 120A can be returned to orchestrator 110 in response to the parameter request data sent at block 1101 at send block 1201.

Returning to the flowchart of FIG. 2, orchestrator 110 at update block 1102 can update data repository 108 to include most recent computing environment characterizing parameter values.

On completion of update block 1102, orchestrator 110 can proceed to action decision block 1103. At action decision block 1103, orchestrator 110 can return an action decision to select one or more test computing environment from a set of candidate computing environments having a threshold level of similarity to a target computing environment being evaluated for software application performance impacting parameter value adjustment. The set of candidate computing environments can include the computing environments of computing environments 120A-120Z other than the target computing environment. Orchestrator 110 in the running of blocks 1101, 1102, and 1103 can be running computing environment examining process 111 as described in reference to FIG. 1.

Orchestrator 110 for return of one or more identified test computing environment having a threshold level of similarity with respect to a target computing environment can perform clustering analysis. In performance of a clustering analysis, orchestrator 110 can identify a computing environment having nearest neighbor computing environment characterizing parameter values relative to computing environment characterizing parameter values of a target computing environment based on cumulative Euclidean distance.

Figure 3:
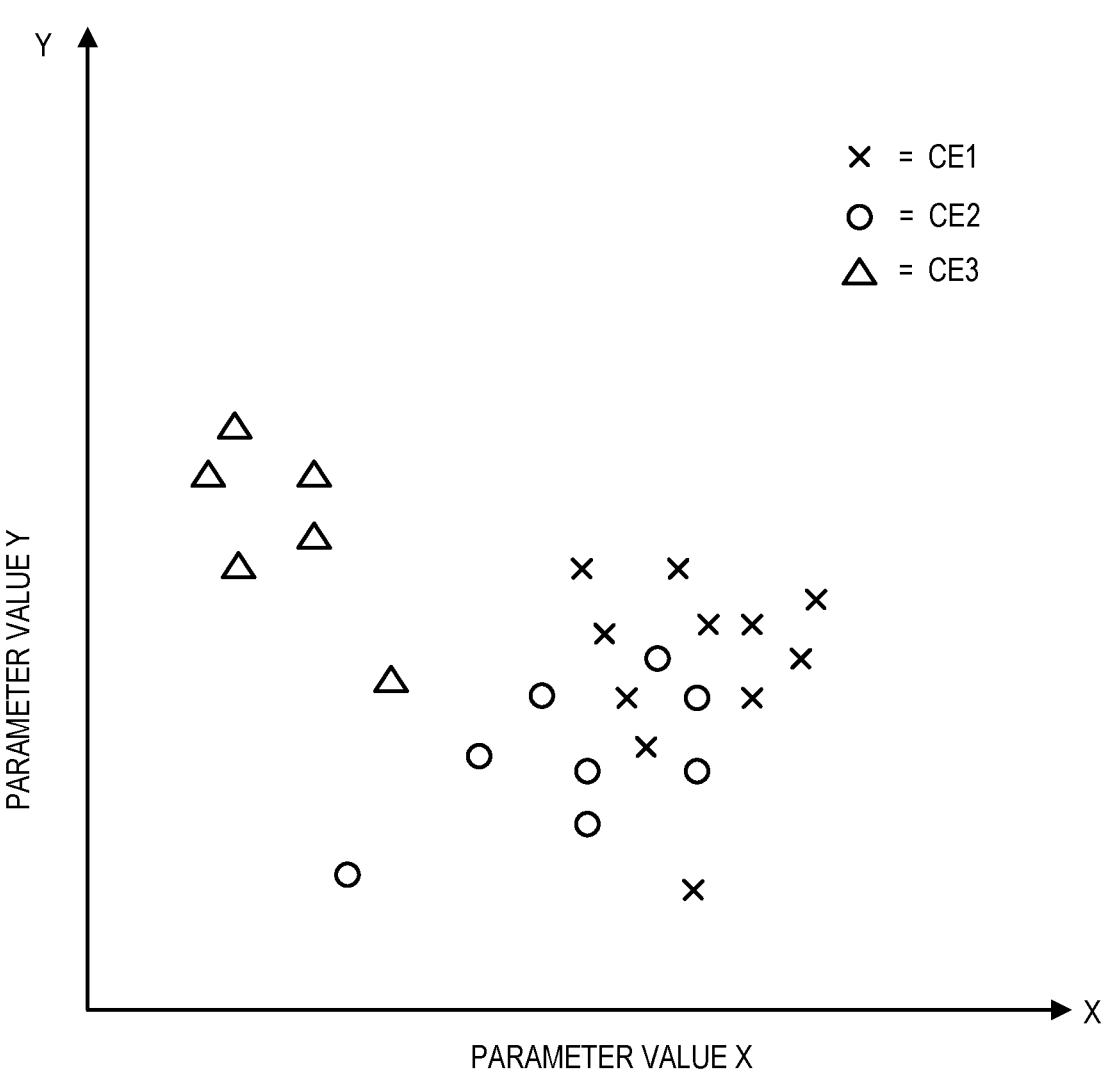
FIG. 3 depicts performance of a clustering analysis for comparing a plurality of computing environments by an orchestrator according to one embodiment.

An example of clustering analysis is depicted in FIG. 3 wherein observations associated to first, second, and third computing environments are shown with the X indicators being observations associated to a target computing environment, the circle indicators being observations associated to a candidate test computing environment, and the triangle indicators being observations associated to a second candidate computing environment. The observations depicted in the simplified embodiment of FIG. 3 can be vectors that specify values of first and second computing environment characterizing parameters, e.g., throughput and latency, for example, or any other set of first and second computing environment parameter values expressed in terms of amplitude. The different observations associated to the respective computing environment subject to clustering analysis can be observations accumulated over time, e.g., within a time window of a current time.

Referring to FIG. 3, it can be seen that orchestrator 110 employing clustering analysis in which aggregate Euclidean distances are accumulated and analyzed can ascertain that the first candidate test computing environment has a higher degree of similarity to the target computing environment than the second candidate computing environment, and, based on additional one or more criterion, can determine that the first candidate test computing environment has a level of similarity to the target computing environment that is within a threshold level. FIG. 3 depicts a clustering analysis performed using first and second observations. Clustering analysis, in another embodiment, can be scaled up to N dimensions, e.g., the N dimensions defined by the multiple computing environment characterizing parameters set forth in reference to computing environment parameters area 2121 of data repository 108 as shown in FIG. 1.

Orchestrator 110 performing action decision 1103 at block 1103 can include orchestrator 110 comparing amplitude-based parameter values as set forth in FIG. 2, as well as parameter values and classification-type parameter values in which parameter values are differentiated in terms of different classifications rather than amplitudes. For comparing parameter values between computing environments that are classification based rather than amplitude based, orchestrator 110 at action decision block 1103 can employ decision data structures as are set forth in Table A below.

TABLE A

|  | HW1 | HW2 | HW3 |
|---|---|---|---|
| HW1 | X | 0.9 | 0.2 |
| HW2 | 0.9 | X | 0.5 |
| HW3 | 0.2 | 0.5 | X |

Referring to Table A, orchestrator 110 in comparing classification-based parameter values between computing environments associated to different computing environments can employ a decision data structure stored in decision data structures area 2123 for facilitating comparison between classification-type parameter values. Referring to Table A, any two arbitrary classifications of infrastructure hardware articles can be compared using a decision data structure configured according to Table A. Compared articles of infrastructure hardware can be, e.g., computing node model numbers, cluster model numbers, cluster configurations, memory hardware classification, storage hardware, classifications, and the like.

In reference to Table A, depicted similarity levels with values of between 0.0 and 1.0 can be pre-tagged by an administrator user interface manually, or alternatively heuristically using appropriate metrics analysis such as metrics described with reference to computing environment parameters area 2121 of FIG. 1.

Orchestrator 110 at action decision block 1103 can provisionally derive an identified test computing environment from a set of candidate test computing environments using clustering analysis and employ decision data structures such as described with reference to Table A across multiple classification-type parameter values to bias the results in the derivation of a final output set of one or more identified test computing environments having a threshold similarity to a target computing environment.

Embodiments herein recognize that a target computing environment and a test computing environment can be located in spaced apart and differentiated geospatial regions. The different geospatial regions provided by a target computing environment and a test computing environment can include geospatial regions that are located, e.g., about 1 Km apart or more, about 10 Km apart or more, about 100 Km apart or more, or about 1000 Km or more (e.g., East Coast and West Coast in the United States).

With test computing environments identified at action decision block 1103, orchestrator 110 can proceed to send block 1104. At send block 1104, orchestrator 110 can send test profile data to the identified test computing environments of computing environments 120A-120Z. The test profile data can include specification data that specifies a profile for a test to be performed on the identified test computing environment. In the performing of testing herein, AB variance testing can be employed. In the performance of AB testing, a software application performance impacting parameter value can be varied slightly and the results analyzed. Based on analysis of results, the tested software application performance impacting parameter value variance can then be employed on a target computing environment. On the receipt of test profile data, the test computing environment of computing environments 120A-120Z can perform testing at block 1202. As noted, the testing can include AB variance testing. In the performance of testing, according to one embodiment, the test computing environment can adjust a software application performance impacting parameter value and the results can be collected and analyzed.

On completion of testing at block 1202, which can include result accumulation, a test computing environment can proceed to block 1203. At block 1203, the test computing environment can ascertain whether testing is complete, and if testing is not complete, the test computing environment can iteratively perform the loop of blocks 1202 and 1203 until testing is completed.

The iterative testing at block 1202 can include orchestrator 110 performing iterative adjustments of different software application performance impacting parameter values. Software application performance impacting parameter values can include parameter values that specify, e.g., a resource provisioning configuration of a virtual machine, a network capacity, a classification of virtual machine, a classification of a computing node hosting an application under test. For adjusting network capacity in accordance with a network capacity software application performance impacting parameter value, manager node 121 of a target computing environment can send appropriate network capacity adjusting commands to appropriate VNF applications running within the computing environment.

In one example, a first test can comprise running a software application under test on computing node of a first classification and a second test in a next iteration comprise running of the software application under test on a second classification of a computing node. In another example, a first test can comprise testing the running of a software application on a virtual machine of a first classification, and a second test can comprise testing of a test software application running on a second classification of a virtual machine. In another example, a first test can comprise testing of a test software application running on a virtual machine of a first resource provisioning configuration, and a second test can comprise testing of a test software application running on a virtual machine of the same classification specified in the first test but having a second resource provisioning configuration. According to any given test profile, there can be N, e.g., one to potentially thousands or millions of different tests. The test profile data sent at block 1104 can specify a particular common software application for testing. The test profile data can include commands that specify a manner in which local manager node 121 of a test computing environment is to administer a test.

On completion of a final test iteration, the test computing environment can proceed to send block 1204. At send block 1204, the test computing environment of computing environments 120A-120Z by its associated manager node 121 can send result data resulting from administration of the test to orchestrator 110. Result data can include metrics data, e.g., including infrastructure utilization parameter values, network utilization parameter values, and user satisfaction level parameter values. In response to receipt of the result data, orchestrator 110 can proceed to action decision block 1105. At action decision block 1105, orchestrator 110 can ascertain whether to adjust a software application performance impacting parameter value of a target software application running in target computing environment being subject to evaluation. For return of the action decision at block 1105, orchestrator 110 can employ Eq. 1 as follows:

$$S = F1\,W1 + F2\,W2 \qquad \text{(Eq. 1)}$$

Where S is an accumulated score associated to a candidate software application performance impacting parameter value adjustment, F1 is a first factor, F2 is a second factor, and W1 and W2 are weights associated to the first factor and the second factor respectively.

Orchestrator 110 at action decision block 1105 can determine to implement a software application performance impacting parameter value adjustment based on the scoring value satisfying a threshold, e.g., a predetermined or dynamically determined threshold.

According to one embodiment, the first factor F1 can be a performance factor. For evaluating performance, orchestrator 110 at action decision block 1105 can examine (i) infrastructure utilization parameter values, (ii) network utilization parameter values, and (iii) user satisfaction level parameter values returned at block 1204 resulting from the iterations of testing by a test computing environment at block 1202. For the software application of scoring values under factor F1, orchestrator 110 at block 1105 can apply the assigned scoring values in dependence on the detected strength of an effect. Embodiments herein recognize that some administered software application performance impacting parameter value adjustments can have a stronger effect than other software application parameter adjustments. Orchestrator 110 at block 1105 can determine the strength of an effect using mixed effect modeling software which can be used to detect the strength of any given effect. For providing a mixed effect model, mixed effect modeling solver software can be used to perform mixed effect model solving. The lme4 package for R provides functions to fit and analyze linear mixed models, generalized linear mixed models, and nonlinear mixed models (R is a programming language and software environment for statistical computing and graphics that is supported by the R Foundation for Statistical Computing). WinBUGS is a statistical software in which there is the glmmBUGS package that provides a bridging tool between Generalized Linear Mixed Models (GLMMs) in R and the BUGS language and can perform mixed effect model analysis (WinBUGS is a statistical software package available from the MRC and Imperial College of Science, Technology and Medicine. In one embodiment, for solving mixed effect models, SAS/STAT® Mixed Effect Modeling Software available from SAS Institute, Inc. of Cary, N.C. (SAS/STAT is a registered trademark of SAS Institute, Inc.) can be used.

Factor F2 in Eq. 1 can be a cost factor. Orchestrator 110 can be configured to assign cost scores under factor F2 in a manner inversely proportional to an assigned cost associated to a possible software application performance impacting parameter value considered for adjustment. In such manner, low cost software application parameter adjustments are more likely to be identified for implementation by orchestrator 110. According to one embodiment, scoring values can be applied under factor F2 in a manner as shown in Table B.

TABLE B

| | Software application performance impacting parameter value adjustment | |
| --- | --- | --- |
| | Cost | F2 scoring value |
| Reprovisioning virtual machine | 0.2 | 0.8 |
| Adjusting network capacity | 0.3 | 0.7 |
| Rehosting to a new virtual machine | 0.6 | 0.4 |
| Rehosting to a new computing node physical machine | 0.7 | 0.3 |

Referring to Table B, low cost software application performance impacting parameter value adjustments such as increasing provisioning of a virtual machine can be assigned higher scores than relatively higher cost actions, such as re-hosting to a new physical machine computing node.

Orchestrator 110 at action decision block 1105 can determine that a candidate software application parameter adjustment is to be implemented based on the scoring value under Eq. 1 exceeding threshold, e.g., a predetermined or dynamically determined threshold.

On completion of action decision block 1105, orchestrator 110 can proceed to send block 1106. At send block 1106, orchestrator 110 can send provisioning data to the target computing environment of computing environments 120A-120Z. In response to receipt of the provisioning data, the target computing environment at block 1205 can perform provisioning in accordance with the provisioning data. The provisioning at block 1205 can include adjusting one or more software application performance impacting parameter value specified by the provisioning data sent at block 1106.

The one or more software application performance impacting parameter value can include, e.g., a software application performance impacting parameter value specifying adjustment of a resource provisioning configuration of a virtual machine, a software application performance impacting parameter value specifying adjustment of a network capacity, e.g., by appropriate network capacity adjusting commands to VNF applications running within the target computing environment, a software application performance impacting parameter value specifying rehosting of a software application on a new virtual machine, a software application parameter value specifying extending hosting of a software application to include hosting by a new virtual machine, a software application parameter value to re-host a software application on a new computing node provided by a physical computing node, and a software application performance impacting parameter value specifying expanding hosting to include hosting by the new computing node provided by physical node.

On completion of provisioning block 1205, the test computing environment and all computing environments 120A-120Z at return block 1206 can return to the block preceding block 1201 to receive a new iteration of parameter request data. Computing environments 120A-120Z can iteratively perform the loop of blocks 1201 to 1206 during a deployment period of computing environments 120A-120Z. Orchestrator 110 on completion of send block 1106 can proceed to return block 1107. At return block 1107, orchestrator 110 can return to a processing stage preceding block 1101. Orchestrator 110 can iteratively perform the loop of blocks 1101 to 1107 during a deployment of orchestrator 110.

At action decision block 1103, orchestrator 110 can include comparing current computing environment characterizing values of a target computing environment to current computing environment characterizing values of a plurality of candidate test computing environments.

In another embodiment, orchestrator 110 at action decision block 1103 can be comparing predicted future computing environment characterizing parameter values of a target computing environment to current and most recent computing environment characterizing parameter values of a plurality of candidate test computing environments. Embodiments herein recognize that similarities or differences between geographic geospatially differentiated computing environments can dynamically change over time. Embodiments herein recognize that a set of test computing environments having a threshold level of similarity to a target computing environment can be different the second subsequent time relative to a current time. Embodiments herein can have features to predict computing environment characterizing values associated to a target computing environment at a future time. With such prediction being provided, orchestrator 110 can select test computing environments from a set of candidate test computing environments that currently have a set of computing environment characterizing values at a current time that exhibit a threshold level of similarity with a predicted future computing environment characterizing values of a target computing environment at a future time. Configured as described, orchestrator 110 can select test computing environments having a threshold satisfying level of similarity to a target computing environment at a future time. Such testing permits anticipatory reprovisioning of a target computing environment prior to a condition being realized.

Figure 4:
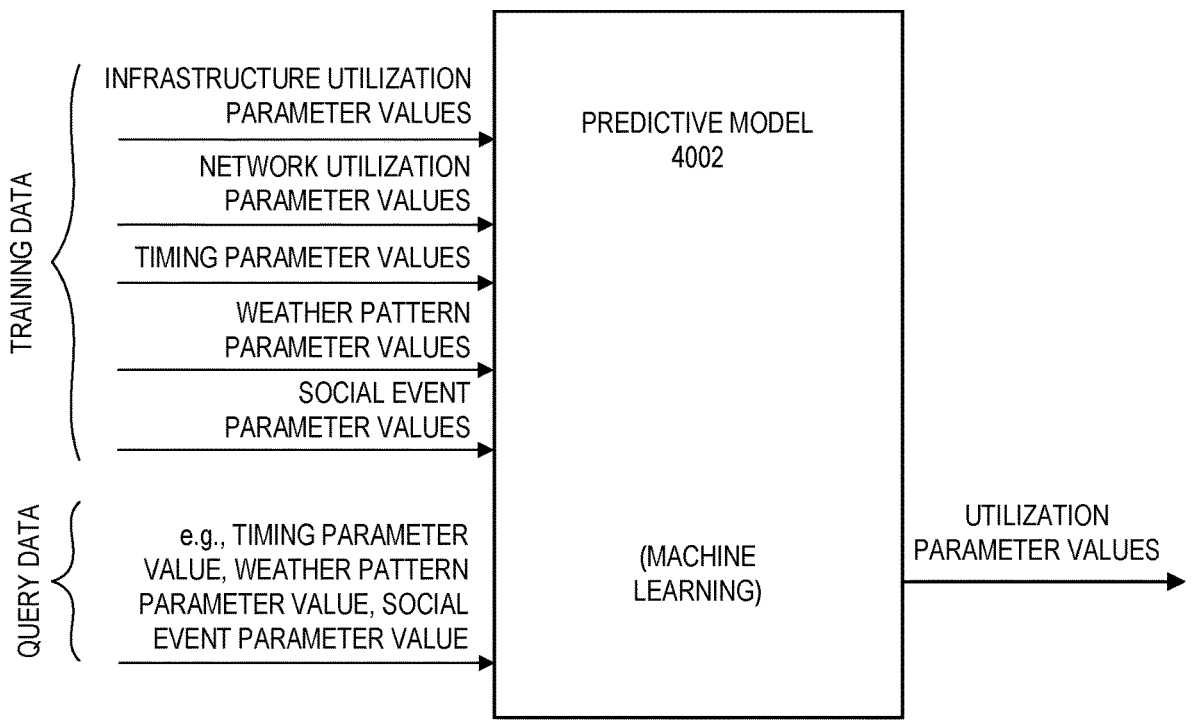
FIG. 4 depicts a predictive model that models the behavior of a computing environment by way of training by machine learning according to one embodiment.

Referring now to FIG. 4, orchestrator 110 can maintain for each respective computing environment of computing environments 120A-120Z an instance of predictive model 4002 which models the predicted behavior of each respective computing environment of computing environments 120A-120Z. An instance of predictive model 4002 can be regarded to be a digital twin of its associated computing environment of computing environments 120A-120Z.

Predictive model 4002 can be trained using machine learning processes. Predictive model 4002 can be trained with iterations of training data, and once trained, predictive model 4002 is able to predict a subsequent future behavior of its associated computing environment. Predictive model 4002 can be trained with iterations of training data, and once trained, predictive model 4002 is able to return predictions. Iterations of training data for training a predictive model can include for each iteration (a) infrastructure utilization parameter values, (b) network utilization parameter values, (c) a timing parameter value specifying a time associated to the described infrastructure utilization parameter values and the network utilization parameter values, (d) one or more weather pattern parameter value, and (e) one or more social event parameter value. The timing parameter value associated to each iteration of training data can specify, e.g., a time-of-day parameter value. The time-of-day parameter value can be classified, e.g., into a business day time-of-day parameter value or a non-business day parameter value. Trained as described, predictive model 4002 is able to learn the relationship between infrastructure and network utilization parameter values and the described timing weather pattern and social event parameter values. Thus, for example, predictive model 4002 is able to learn an impact on infrastructure and network utilization parameter values resulting from the time-of-day, e.g., rush-hour, or a weather pattern, e.g., a temperature surge, and/or a social event, e.g., a crowd event at a stadium, a convention center, or the like.

Predictive model 4002, once trained, is able to respond to query data. Query data, as indicated in FIG. 4, can include a combination of a timing parameter value, a weather parameter value, and/or social event parameter value. In some instances where there is no special expected future weather event or social event, an input query data can include only a timing parameter value, such as a business day time-of-day parameter value. In one example, orchestrator 110 at action decision block 1103 can input into predictive model 4002, for a certain target computing environment, a timing parameter value specifying a time of a current day but translated in time to a future time, e.g., a rush-hour time subsequent to a current time.

In response to the input timing parameter value, predictive model 4002 can output predicted future utilization parameter values including infrastructure utilization parameter values and network utilization parameter values at the specified future time. Query data can include more advanced query data such as query data that specifies, in addition to a timing parameter value or in place of a timing parameter value, weather pattern parameter values, e.g., a temperature, or one or more social event parameter value, e.g., specifying the occurrence of an expected crowd event. Predictive model 4002 by its output will return predicted utilization parameter values associated to the specified future time having an associated certain weather event and/or social event. At action decision block 1103, orchestrator 110 can then identify a set of test computing environments which currently are exhibiting a set of computing environment characterizing parameter values having a threshold similarity to the predicted future time computing environment characterizing parameter values associated to the target computing environment. Then, with the performance of blocks 1104, 1202, and 1203, the identified and selected test computing environments selected from a set of candidate test computing environments can perform testing of a certain software application using the described multivariant testing set forth herein, and then based on a determination at action decision block 1105, orchestrator, at send block 1106, can send provisioning data to adjust one or more software application performance impacting parameter value on the test computing environment impacting the performance of the certain software application running in the target computing environment.

Various available tools, libraries, and/or services can be utilized for implementation of predictive model 4002. For example, a machine learning service can provide access to libraries and executable code for support of machine learning functions. A machine learning service can provide access to a set of REST APIs that can be called from any programming language and that permit the integration of predictive analytics into any software application. Enabled REST APIs can provide, e.g., retrieval of metadata for a given predictive model, deployment of models and management of deployed models, online deployment, scoring, batch deployment, stream deployment, monitoring, and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access to a set of REST APIs that can be called from any programming language and that permit the integration of predictive analytics into any software application. Enabled REST APIs can provide, e.g., retrieval of metadata for a given predictive model, deployment of models and management of deployed models, online deployment, scoring, batch deployment, stream deployment, monitoring, and retraining deployed models. Predictive model 4002 can employ various machine learning technologies, e.g., support vector machines (SVM), Bayesian networks, curve fitting tools, random forests, neural networks, and/or other machine learning technologies.

Orchestrator 110 can be configured to provide for reprovisioning of a target computing environment in a variety of useful scenarios. Embodiments herein recognize that a target computing environment, such as computing environment 120A, in one example, can be expected to exhibit behavior patterns that transition over the course of a business day, e.g., characterized by peak loading during rush hour in one scenario. In the performance of the prediction, orchestrator 110 can return a set of predicted computing environment characterizing parameter values that characterize the target computing environment at the future rush-hour time.

Orchestrator 110 can then compare the derived predicted set of computing environment characterizing parameter values to current computing environment characterizing values that characterize a set of candidate test computing environments. Based on the special behavior of the various candidate test computing environments, test computing environments exhibiting current rush-hour special behavior can be expected to be yielded by orchestrator 110 in the selection of test computing environments from the set of candidate computing environments using the selection methods described with reference to FIG. 3 in Table A. In the described scenario, orchestrator 110, using that described clustering analysis, can select the test environments currently experiencing rush hour behavior as test computing environments, which test computing environments emulate the predicted future behavior of a target computing environment.

In another use case scenario, orchestrator 110 with use of received data from weather service system 140 can ascertain a particular predicted weather pattern predicted to occur with respect to computing environment 120A which can be a target computing environment in the described scenario. Orchestrator 110, based on the predicted future weather data, can predict the behavior of a target computing environment influenced by the predicted future weather data at a predicted future point in time. Orchestrator 110 then can compare computing environment characterizing parameter values of the target computing environment at the predicted future time to current computing environment characterizing parameter values characterizing various candidate test computing environments at a current time in order to identify one or more test computing environment experiencing the weather pattern influenced behavior predicted to occur with respect to the target computing environment at the future time.

In another example, orchestrator 110 can predict the future behavior of a target computing environment at a future time wherein the predicted future time behavior of the target computing environment is expected to be influenced by a scheduled social event, e.g., a crowd event at a stadium or convention center or the like.

Embodiments herein can provide a method for context-aware speculative multivariant configuration testing on a computing environment which can be provided by a 5G multi-access edge computing (MEC) environments to optimize service allocation, resource utilization, user experience or other parameters. Embodiments herein provide for speculative testing of machine-generated configuration variations in different contexts at the levels of software application configuration, service distribution, virtualization environment configuration, and hardware configuration. Embodiments herein can observe the results in terms of end-user experience, resource utilization, service behavior and others to analyze the cost-benefit of the configuration implementation during a test period until a given economic equilibrium is achieved.

Embodiments herein, according to one example, can provide system administrators of 5G-MEC infrastructure and 5G Core Networks with a new approach to optimize the performance of a software application infrastructure configuration in diverse context scenarios when optimum orchestration strategies are unknown or not well defined, covering for an important demand to improve the performance of 5G-MEC-based services.

Embodiments herein can provide a "context-aware" A/B test for 5G-MEC configurations, which takes into consideration the unique features of 5G-MEC computing environments including modularity, regional distribution, monitoring capabilities, and context locality to promote testing of alternative configurations throughout 5G-MEC regions. Similarly, with multivariant testing in A/B tests, multiple configurations can be generated, deployed for given segments (or contexts in this case), and the results analyzed to determine the best solution.

Embodiments herein recognize that 5G-MEC infrastructure can include complex, dynamic, and distributed domains where service orchestrations can involve a multitude of variables that can be tested through diverse context variations making if difficult (or impossible) to have pre-defined configuration rules for all combinations.

Embodiments herein recognize that 5G-MEC infrastructure exists in a dynamic context scenario impacted by environmental changes, such as social mobility, weather events, social events, and others. Configuration and orchestration strategies can feature implementations that are continuously reassessed in response to these events to ensure the best end-user experience and service level agreements (SLAs).

Embodiments herein recognize that current 5G-MEC orchestration strategies are not explored for possible combinations of configuration variables, environmental events, social events, and other factors that affect 5G-MEC infrastructure performance and service performances. Current models for 5G-MEC service orchestrations have been observed to be predetermined and implemented intermittently, based on a combination between fact-based and expertise-driven strategies.

Embodiments herein can provide for speculative (i.e., not pre-determined) domain explorations for 5G-MEC infrastructure configuration that take advantage of the unique features of 5G-MEC environment, such as regional setups, context diversity, situation dynamics, distribution, interconnection, and others.

Embodiments herein can provide a mechanism for context-aware dynamic multivariant testing of configuration variation in 5G-MEC infrastructures aiming to optimize service allocation, resource utilization, user experience, and others.

Embodiments herein provide for speculative testing of machine-generated configuration variations, generated through meta-heuristic methods for creating configuration variations, which are tested in context-related regions to assess the impact of the alternative configuration over the infrastructure and user experience. Embodiments herein can make use of inherent characteristics of 5G-MEC environments such as regional setups, context diversity, situation dynamics, distribution, interconnection, and others.

Embodiments herein can collect and analyze information about 5G-MEC infrastructure operations, including software application configuration, service distribution, virtualization environment configuration, and hardware configuration.

Embodiments herein can collect and analyze information about 5G-MEC infrastructure operations such as regional setups, context diversity, situation dynamics, distribution, interconnection, and others.

Embodiments herein can collect and analyze environmental information captured about events, social setting, and environment, and combine with information about service operation parameters such as user experience, resource utilization, network latency, network capacity utilization, and others.

Embodiments herein can generate multivariant configurations through meta-heuristic methods, taking into consideration the unique features of 5G-MEC environments including modularity, regional distribution, monitoring capabilities, and context locality to promote testing of alternative configurations throughout 5G-MEC regions.

Embodiments herein can deploy test configurations at small scale, controlled regions and segments to speculate the results of different configuration variations in different contexts.

Embodiments herein can collect data on the performance impact over service operation parameters such as user experience, resource utilization, network latency, network capacity utilization, and others.

Embodiments herein can assess the cost-benefit of implementing the configuration variation in a given context; when a given cost-benefit ratio is achieved, report the best configuration tested to the system administrator along with an explanation on the parameters being adjusted, context variables, and results obtained.

Embodiments herein can permit system administrators to decide for the effective implementation in that region or larger scope and/or automated processes for continuous adjustment.

Embodiments herein can provide for learning and adjusting from multiple interactions, promoting reinforcement learning on the operation rules for continuous self-improvement.

As a result, the best performing variations can be ranked based on defined key performance indicators (KPIs) and presented to operators as a report recommending possible configuration adjustment on wider regions or whole infrastructure, along with assessment of cost-benefit for the adjustment and a degree of confidence. An alternative implementation could automate the process of implementing the proposed adjustments in a controlled environment or supervised production systems.

Example 1

A system administrator wants to explore alternative 5G-MEC computing environment configurations to support, e.g., 5G authentication, web traffic, and local video compression in regions where sport events are happening. The objective is to improve user experience by reducing latency and preventing video jittering due to overload services and infrastructure (see FIG. 5, Region 3).

The system administrator enters a request to explore variations of allocation of virtual computing to execute these services on the target regions. The variations are tested on 5G-MEC computing environments determined to have a threshold satisfying level of similarity with the target context (Region 3).

The system continuously collects the resulting impact on network utilization, resource utilization, and user experience for different variations of configuration.

The system analyzes the cost-benefit of each variation, e.g., assessing issues with video uttering, customer feedback, and resources being allocated to support the services. Once a determined ratio is achieved, the system stops the tests and reports the best configuration to the system administrator; otherwise, the system stops the test after timeout.

Example 2

A system administrator wants to explore alternative 5G-MEC computing environment configurations to support, e.g., industrial visual AI and web traffic in regions covering Industry 4.0. The objective business value can be achieved by providing localized low-latency services to regional business customers (see FIG. 1, Regions 4 and 6)

A system administrator enters a request into the system implementing explore variations of allocation of virtual computing to execute these services on the target regions.

The variations are tested on 5G-MEC computing environments determined to have a threshold level of similarity with the target context (Regions 4 and 6).

The system can continuously collect the resulting impact on network utilization, resource utilization, and user experience for different variations of configuration. The system analyzes the cost-benefit of each variation, e.g., assessing the response time for video analytics and visual recognition requests, level of confidence by the training models, and resources being allocated to support the services; once a determined ratio is achieved, the system stops the tests and reports the best configuration to the system administrator; otherwise, the system stops the test after timeout.

End of Example 2

Embodiments herein can provide a mechanism for machine-generated configuration variations and multivariant configurations through metaheuristic methods, taking in consideration the unique features of 5G-MEC environments including modularity, regional distribution, monitoring capabilities, and context locality to promote testing of alternative configurations throughout 5G-MEC regions.

Embodiments herein can explore the regionality and environmental information unique to 5G-MEC infrastructure to promote contextualized, distributed machine-generated configuration experimentation. Embodiments herein recognize that 5G-MEC computing environments can be distributed in different regions affected by variable communication capacity, features of the region, such as topology, weather events, social mobility, etc., and possibly diverse hardware profiles between computing environments. Embodiments herein can provide methods to select 5G-MEC regions with similar configurations and situations and takes into consideration 5G-MEC regionality, diversity, and distribution in a context-aware approach.

Embodiments herein can provide a dynamic mechanism to evaluate cost-benefit of the configuration implementation in a specific regional context, assess current parameters against expected results, and correlate with the cost to implement the configuration in that specific 5G-MEC infrastructure context. The process is thus dynamic in the sense that the method does not have a pre-configure scripted approach and will try multiple variations of configuration in different operational and context settings to assess the best approaches based on observable results.

Example 3

(1) A system administrator submits a list of requirements to execute multivariant tests in given regions providing the list of regions, configurations, and services to be tested, along with the metrics to be observed during the experiment.

(2) A system implementing an embodiment of this invention generates the multivariant configurations for specific contexts and regions, and executes these configuration changes on target 5G-MEC computing environments, observing the results in system performance, behavior, and end-user experience; the system calculates the estimated cost-benefit for applying the adjusted configuration per computing environment per context; the system returns a report containing recommendations or configuration adjustments per computing environment and region, per context, along with an explanation on the parameters being adjusted, context variables, and results obtained.

(3) The method promotes reinforcement learning on rules that generated the best configuration variations for the specific scenario, aiming at continuous improvement.

Figure 6A:
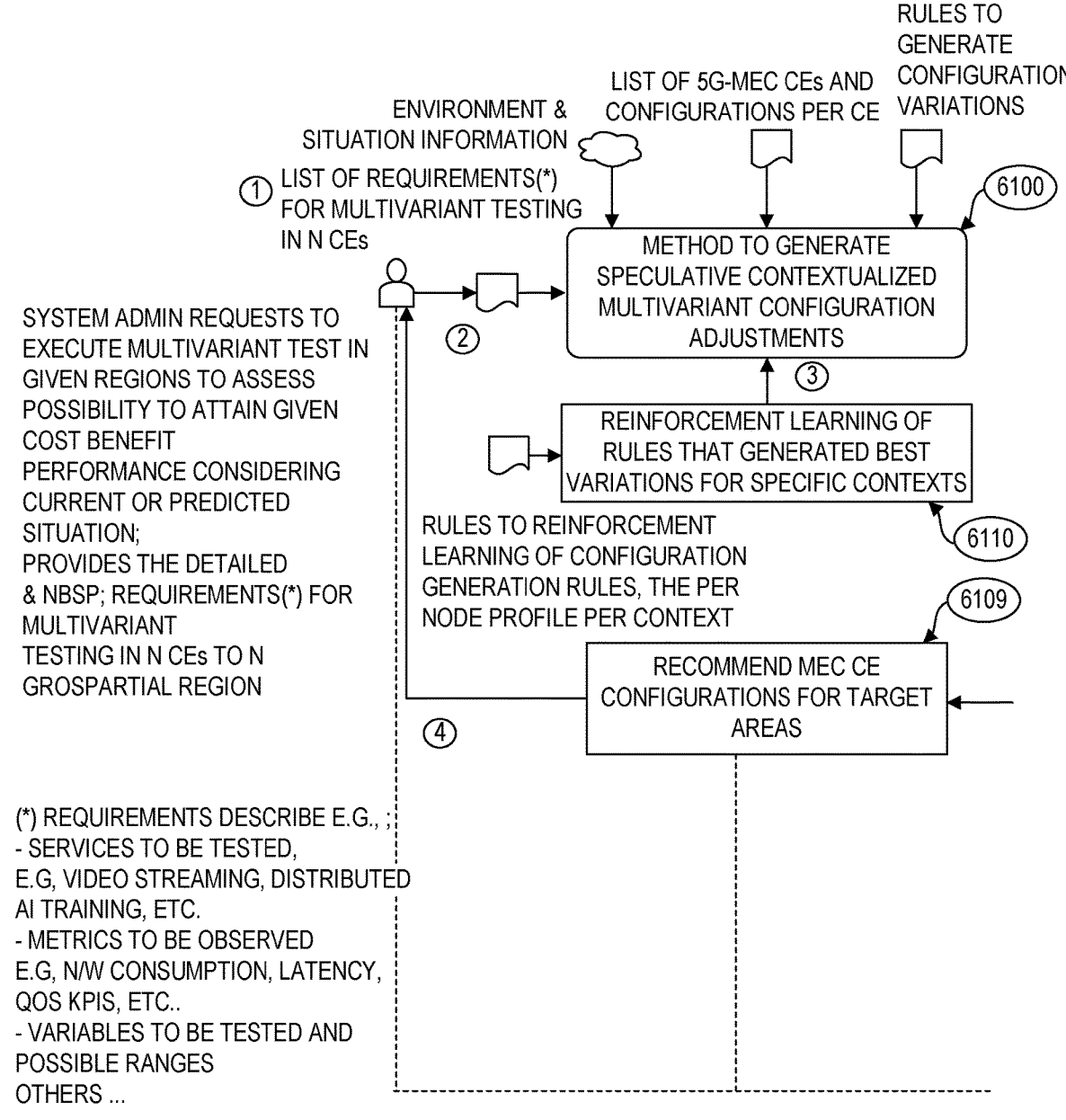
FIG. 6A-6C is a flowchart illustrating performance of a method by an orchestrator according to one embodiment.
Figure 6B:
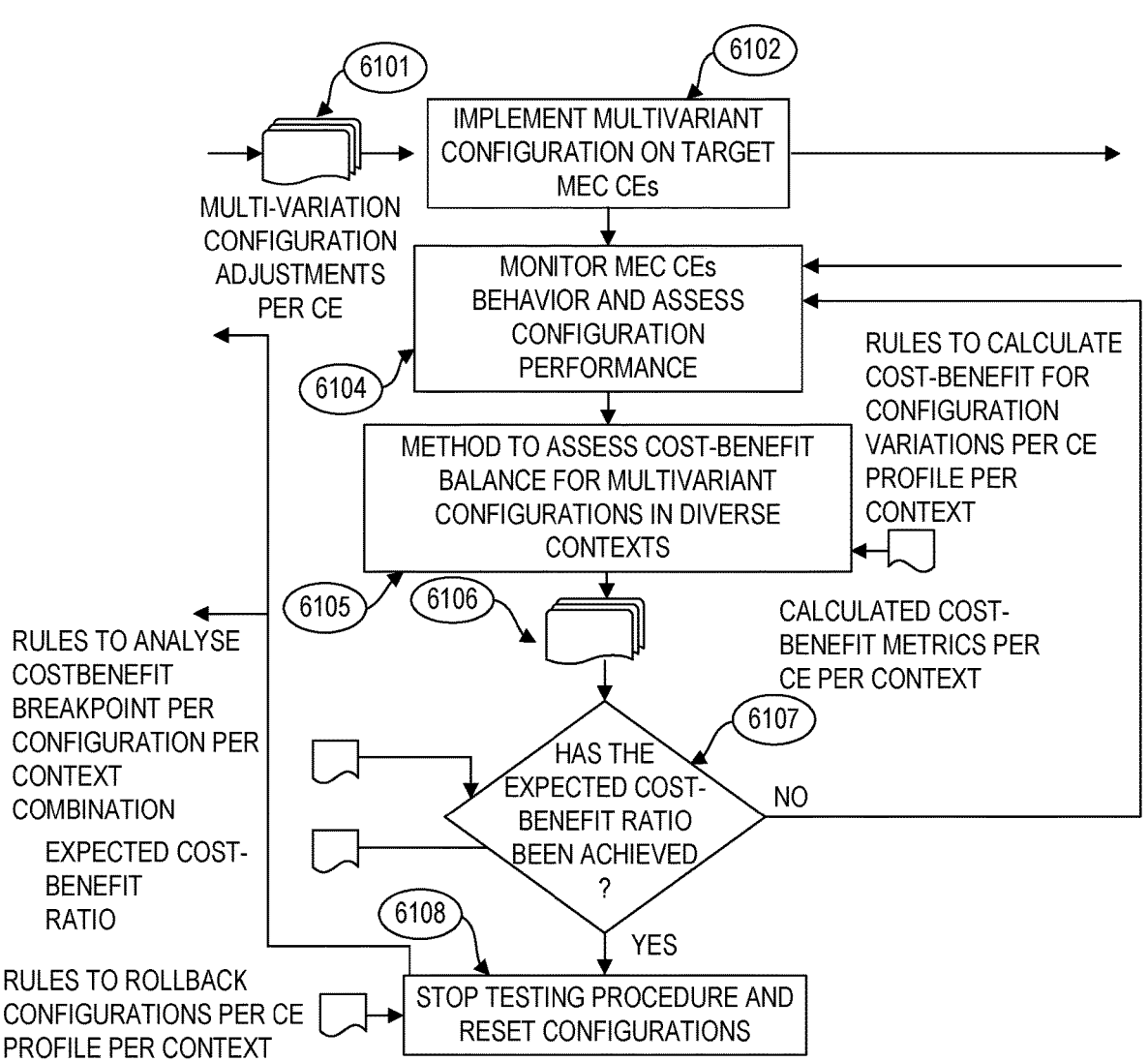
Figure 6C:
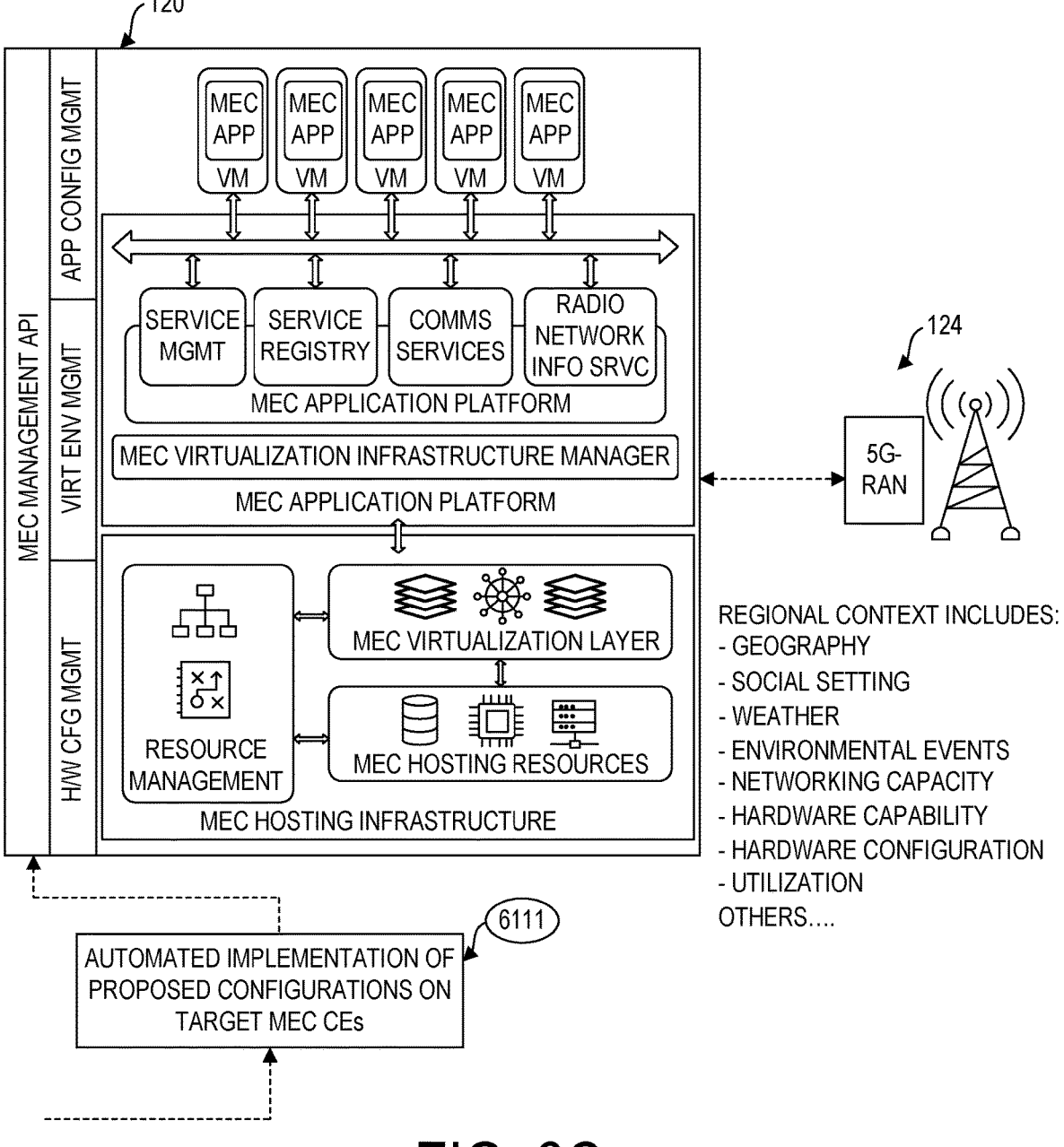

(4) Optionally, the system can provide an interface to automate the delivery of the proposed configurations on target 5G-MEC computing environments. The process can work as follows (see FIGS. 6A-6C):

Method 6100 to generate speculative contextualized multivariant configuration adjustments receives (1) the list of requirements to execute multivariant tests in given regions providing the list of regions, configurations, and services to be tested, along with the metrics to be observed during the experiment. The list of requirements can contain details such as: (i) services to be tested such as video streaming, distributed AI training, and others; (ii) metrics to be observed, e.g., n/w utilization, latency, quality of service (QoS) key performance indicators (KPIs), and others; (iii) expected cost-benefit ratio for applicable alternative configurations; (iv) testing regions or characteristics of the testing regions to be selected; and (v) safety protocols to be followed, and others.

Method 6100 can include access to information about the current situation, operational scenario, and operational rules, including: (i) information about environment and situation, (ii) the list of 5G MEC stations and configurations per regions, and (iii) a set of rules on how to generate configuration variations for specific context, configurations, objectives, and others.

Figure 7:
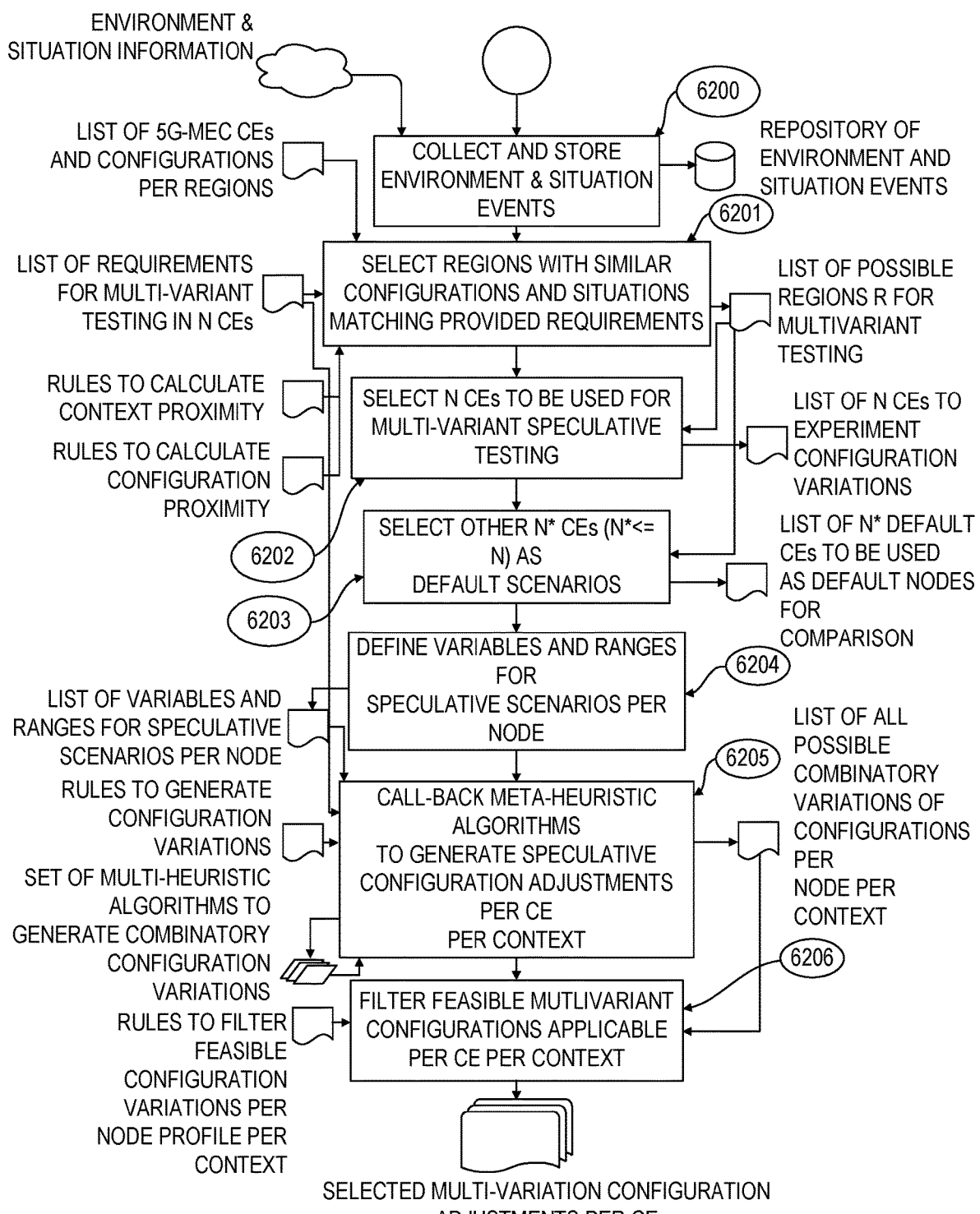
FIG. 7 is a flowchart illustrating operation of a method for performance of an orchestrator according to one embodiment.

Method 6100 can generate multivariant configurations through metaheuristic methods, taking into consideration the unique features of 5G-MEC environments including modularity, regional distribution, monitoring capabilities, and context locality to promote testing of alternative configurations throughout 5G-MEC regions (detailed in FIG. 7).

Method 6100 can generate (6101) multivariant configuration adjustments applicable per 5G-MEC computing environment containing configuration adjustments per computing environment per context at the levels of software application configuration, service distribution, virtualization environment configuration, and hardware configuration.

Method 6102 can implement the configuration adjustments on 5G-MEC computing environments through MEC management APIs of computing environment 120 at the levels of software application configuration, service distribution, virtualization environment configuration, and hardware configuration. Method 6111 (FIG. 6C) can perform automated implementation of proposed configurations on target MEC computing environments.

Method 6104 can collect 5G-MEC computing environment information to assess performance metrics, behavior, and end-user experience metrics through the MEC management APIs following a set of rules that determine what metrics to monitor per computing environment profile, per context, for a given set of implemented configurations.

Method 6105 can implement the algorithms to access cost-benefit balance of the multivariant configurations per computing environments and groups of computing nodes, per context, following a set of rules to calculate cost-benefit for configuration variations per context per computing environment profile, resulting in the list (6106) of calculated cost-benefits metrics per computing environment per context.

Method 6107 can analyze whether the expected cost-benefit ratio has been achieved based on the results in the list (6106) of calculated cost-benefit metrics per computing environment per context and following a set of rules to analyze cost-benefit ratios per computing environment profile per context. If the expected cost-benefit ratio has not been reached, the process loops back to the observation stage. Otherwise, the process moves forward to stop the testing by calling method 6107.

Method 6108 can be executed either when the desired cost-benefit ratio is reached or the operation time out. The method can implement the operations to stop the testing process and restore the original configurations on the target computing environments, following a set of rules to rollback configurations per computing environment profile per context.

Method 6109 can generate a report recommending possible configuration adjustment on wider regions or whole infrastructure, along with assessment of cost-benefit for the adjustment and a degree of confidence.

Method 6110 can promote reinforcement learning on the rules to generate configuration variations applied for generating the successful multivariant configurations, i.e., the configurations that result in expected cost-benefit ratio, following a set of rules of reinforcement learning of configuration generation rules, per computing environment profile per context.

Method 6100 (FIG. 6A) to generate speculative contextualized multivariant configuration adjustments 6100 can include features as follows as described with reference to the flowchart of FIG. 7.

Method 6200 can provide the functionality to collect and store environment and situation events by accessing the connected APIs and data sources associated to elements of the environment and situation information, and creating the repository of environment and situation events required for the processing.

Method 6201 can provide the functionality to select computing environments with similar configurations and situations matching provided requirements by correlating (i) a list of 5G-MEC stations and configurations per regions; (ii) a list of requirements for multivariant testing in N regions, and following the (iii) rules to calculate context proximity, and (iv) rules to calculate configuration proximity. Method 6201 can generate a list of possible regions R for multivariant testing.

Method 6202 can provide the functionality to select N computing environments associated to N regions to be used for multivariant speculative testing using the list of possible regions R for multivariant testing generated by method 6201. Method 6201 can generate a list of N computing environments to experiment with configuration variations.

Method 6203 can provide the functionality to select other N* computing environments (N*<=N) as default scenarios to be used as 'base comparison' for the testing and comparison exercise. Method 6203 can generate the list of N* default computing environments to be used as default computing environments for comparison.

Method 6204 can provide the functionality to define variables and ranges for speculative scenarios per computing environment. Method 6204 can generate a list of variables and ranges for speculative scenarios per computing environment.

Method 6205 can provide the functionality to callback metaheuristic algorithms to generate speculative configuration adjustments per computing environment per context. Method 6205 can include a set of multiheuristic algorithms to generate combinatory configuration variations implementing the main part of the intelligence through techniques like genetic algorithms, combinatory methods, random generation processes, and others. Method 6205 can follow the rules to generate configuration variations. Method 6205 can generate the list of all possible combinatory variations of configurations per computing environment per context.

Method 6206 can provide the functionality to filter feasible multivariant configurations applicable per computing environment per context out of the list of all possible combinatory variations of configurations per computing environment per context, following the rules to filter feasible configuration variations per configuration profile per context. Method 6206 can generate the selected multivariant configuration adjustments per computing environment that can be applied in the continuation of the process.

Figure 8:
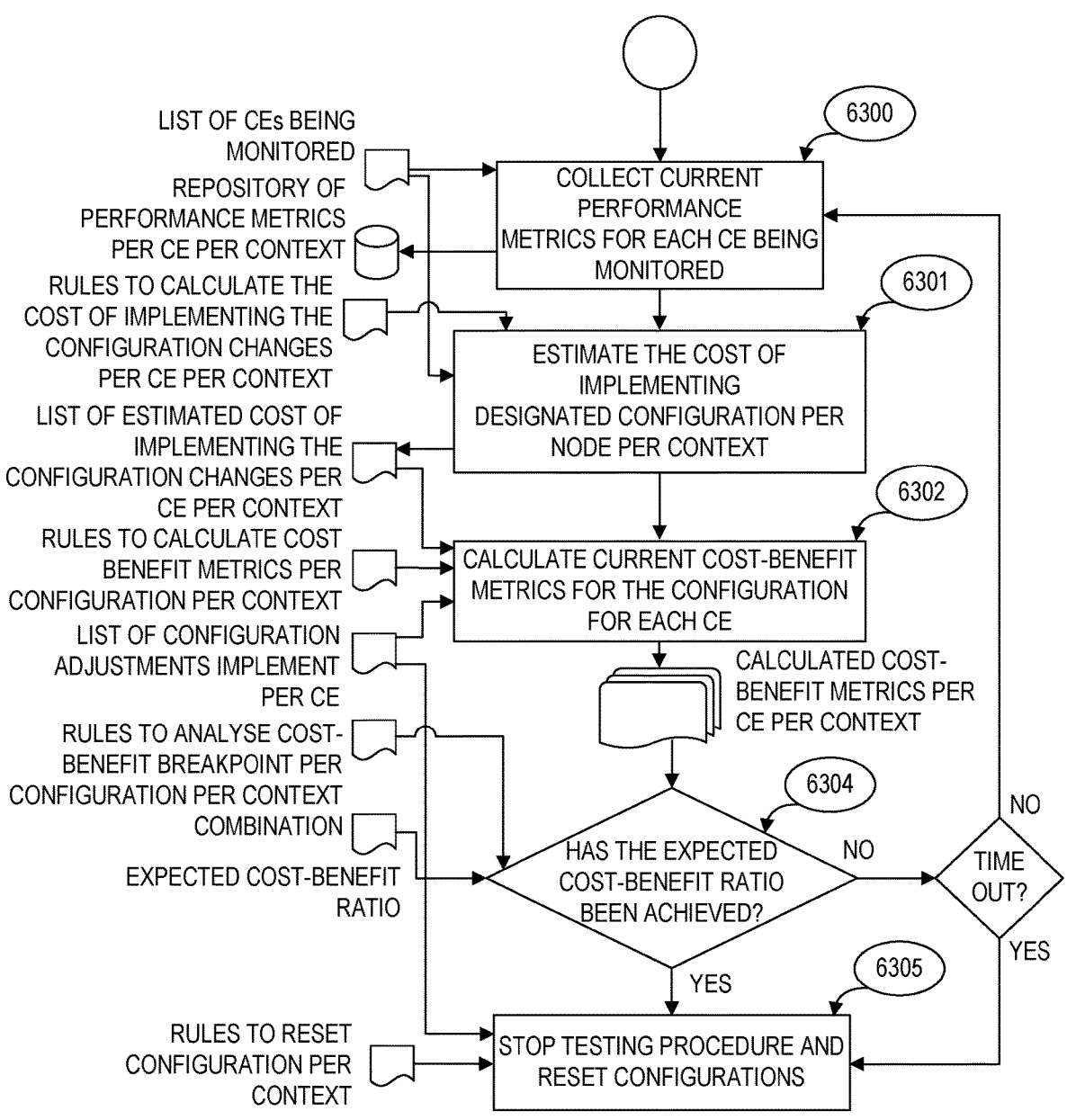
FIG. 8 is a flowchart illustrating operation of a method for performance by an orchestrator according to one embodiment.

Method 6105 (FIG. 6B) to assess cost-benefit balance for multivariant configurations in diverse contexts can include features as follows as described with reference to the flowchart of FIG. 8.

Method 6300 can provide the functionality to collect current performance metrics for each computing environment being monitored based on the list of computing environments being monitored and access to the MEC management APIs at the levels of software application configuration, service distribution, virtualization environment configuration, and hardware configuration. The execution can maintain the repository of performance metrics per computing environment per context, which is used by other methods in this process.

Method 6301 can provide the functionality to estimate the cost of implementing designated configuration per computing environment per context. Method 6301 can apply the rules to calculate the cost of implementing the configuration changes per computing environment per context and can populate the list of estimated costs of implementing the configuration changes per computing environment per context, which is used by other methods in this process.

Method 6302 can provide the functionality to calculate current cost-benefit metrics for the configuration for each computing environment at each region, based on rules to calculate cost-benefit metrics per configuration per context, generating the calculated cost-benefit metrics per computing environment per context, which is used in the continuation of method 6302.

Method 6304 can provide the functionality for the decision point on whether the expected cost benefit ratio been achieved based on the rules to analyze cost-benefit breakpoint per configuration per context combination and considering the expected cost-benefit ratio provided by the user during the request of this process. If the expected cost-benefit ratio has not been achieved yet, the process can circle back to the monitoring stage in method 6300.

When the expected cost-benefit ratio has been achieved or times out, method 6305 provides the functionality to stop the testing process and restore the original configurations on the target computing environments, following a set of rules to rollback configurations per computing environment profile per context.

End of Example 3

Figure 9:
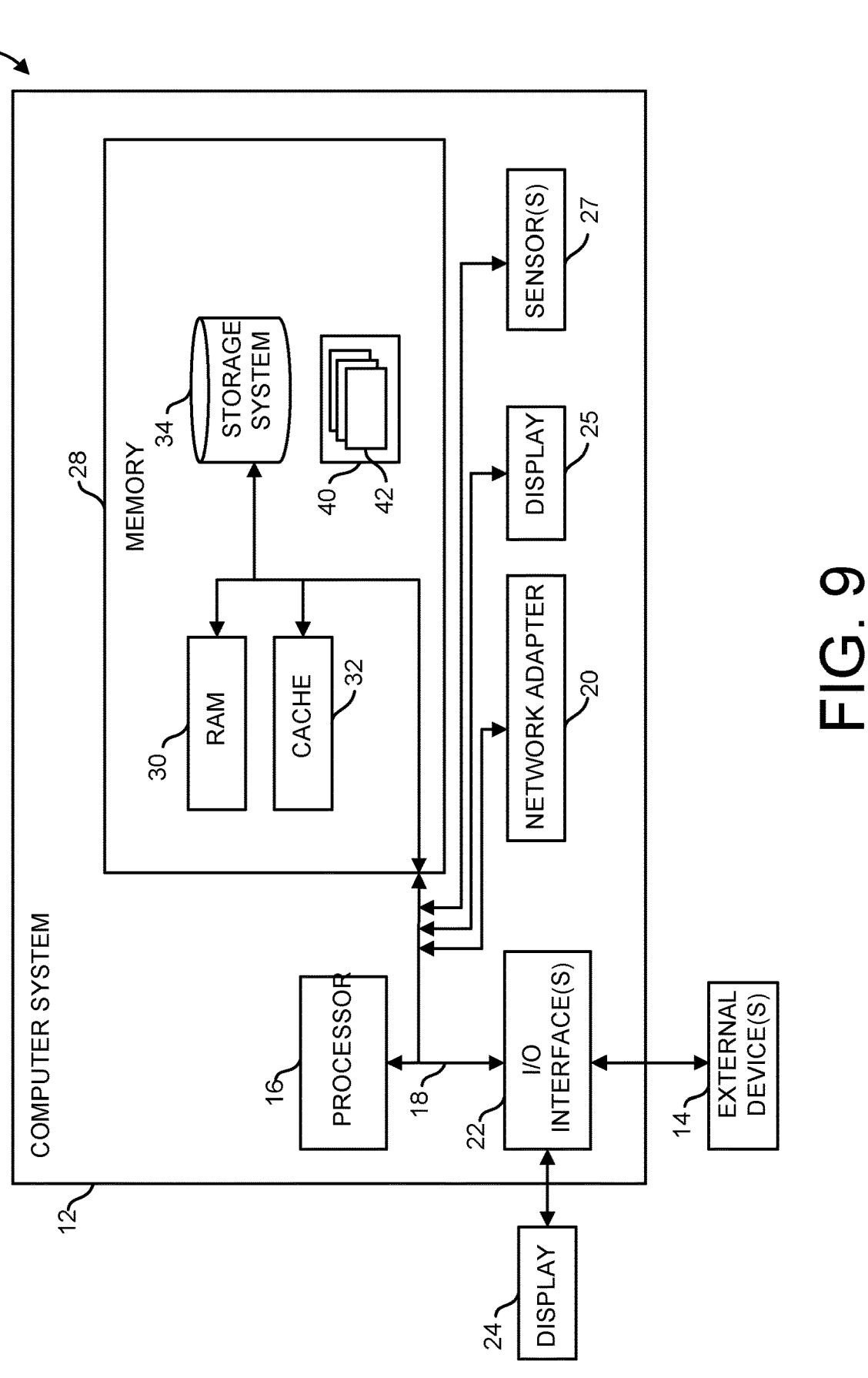
FIG. 9 depicts a computing node according to one embodiment.
Figure 10:
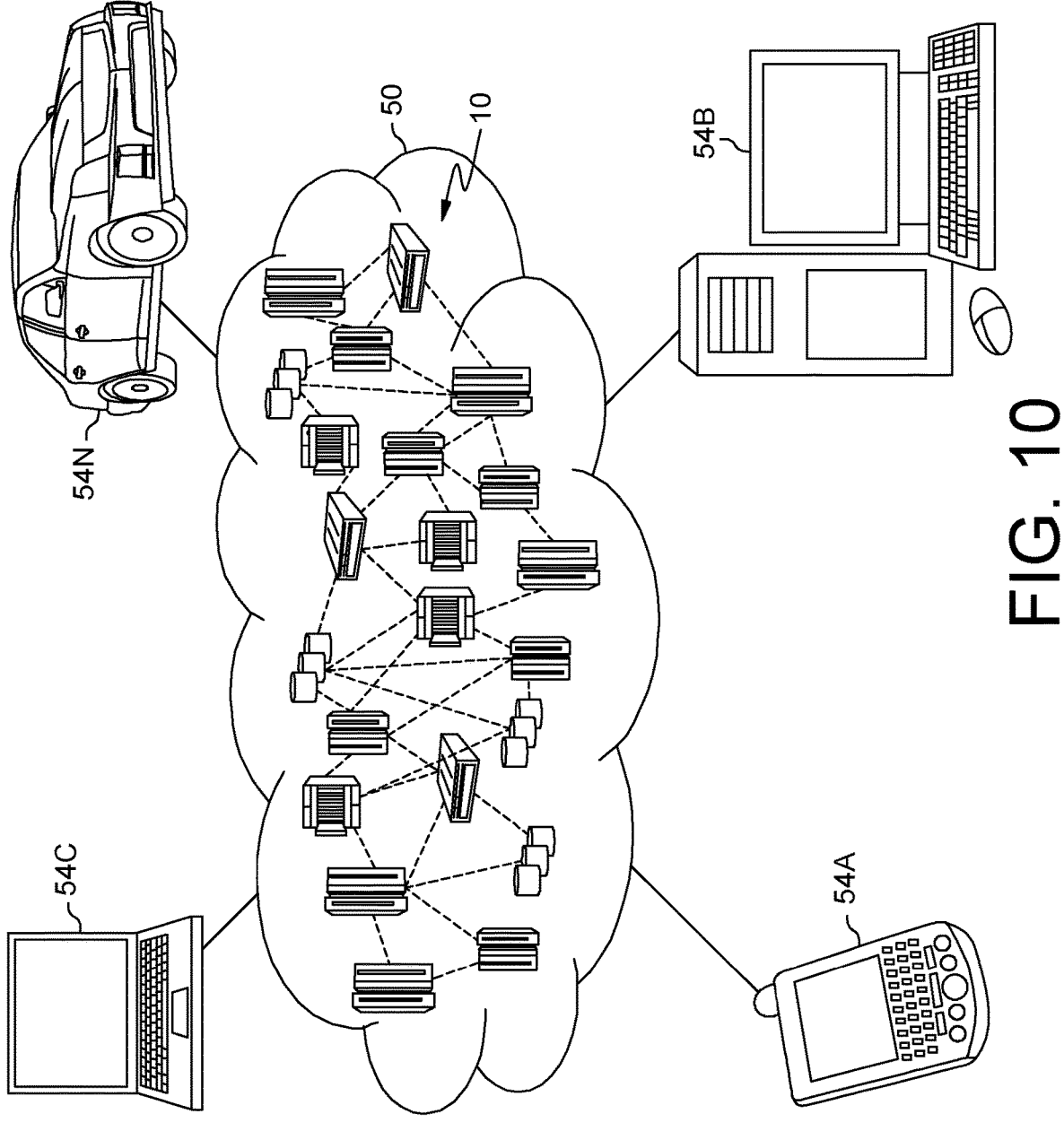
FIG. 10 depicts a cloud computing environment according to one embodiment.
Figure 11:
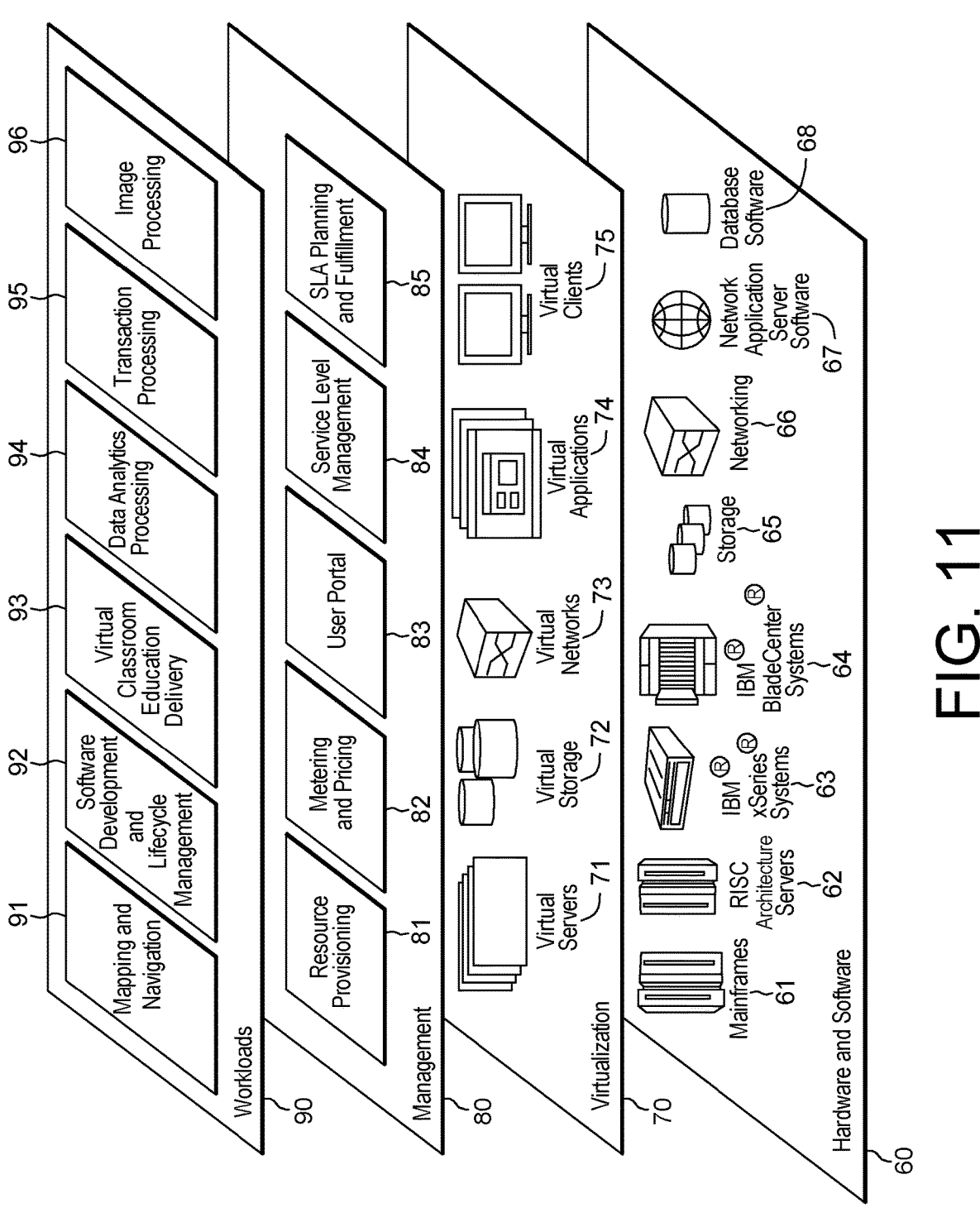
FIG. 11 depicts abstraction model layers according to one embodiment.

Certain embodiments herein may offer various technical computing advantages, practical software applications involving computing advantages, and practical software applications to address problems arising in the realm of computer networks and computer systems. Embodiments 25
2526 herein can feature an orchestrator in communication with the plurality of computing environments, wherein the plurality of computing environments can be edge computing environments located within respective edge networks. A plurality of computing environments can be geospatially differentiated computing environments, e.g., located in dispersed and spaced apart geospatial regions throughout an area. In one embodiment, the orchestrator can iteratively obtain computing environment characterizing parameter values that characterize respectively the various geospatially differentiated computing environments. The orchestrator can compare characterizing parameter values that characterize the various computing environments and can iteratively identify computing environments of the plurality of computing environments having a threshold level of similarity. The orchestrator, for provisioning a target software application running on a target computing environment, can select as a test computing environment a computing environment identified as having a threshold level of similarity to the target computing environment. The orchestrator can use multivariant testing to test the target software application on the test computing environment, and based on the results, the orchestrator can return an action decision to adjust one or more software application performance impacting parameter value on the target computing environment. The one or more software application performance impacting parameter value can be a parameter value that impacts the performance of the target software application on the target computing environment. The software application performance impacting parameter value can include, e.g., a software application performance impacting parameter value that specifies. e.g., a resource provisioning configuration for a virtual machine hosting the target software application, a network capacity, the type of virtual machine hosting the target software application, the type of computing node provided by a physical computing node hosting the target software application, and/or numerous additional software application performance impacting parameter values impacting the performance of the target software application. In one embodiment, the orchestrator can query a predictive model that has been trained to model the behavior of a target computing environment. The orchestrator can query the predictive model to return computing environment characterizing parameter values that characterize a target computing environment at a future time subsequent in time from a current time. The orchestrator, for a selection of one or more test computing environment, can compare the predicted future set of characterizing parameter values characterizing a target computing environment with respect to current computing environment characterizing parameter values that characterize candidate test computing environments. Based on the described processing, the orchestrator can select as a test computing environment a computing environment that is currently exhibiting a behavior having a threshold level of similarity to a predicted future behavior of a target computing environment. Thus, the orchestrator can predictively adjust one or more software application performance impacting parameter value so that the target software application and computing environment can be reprovisioned in an anticipatory manner prior to a need for reconfiguration arising. Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability can be iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, software applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's software applications running on a cloud infrastructure. The software applications are accessible from various client devices through a thin client interface such as a web browser (e.g., web-based e-mail). The consumer does not manage or control the underlying cloud infrastructure including network, servers, operating systems, storage, or even individual software application capabilities, with the possible exception of limited user-specific software application configuration settings.

Platform as a Service (PaaS): the capability provided to the consumer is to deploy onto the cloud infrastructure consumer-created or acquired software applications created using programming languages and tools supported by the provider. The consumer does not manage or control the underlying cloud infrastructure including networks, servers, operating systems, or storage, but has control over the deployed software applications and possibly software application hosting environment configurations.

Infrastructure as a Service (IaaS): the capability provided to the consumer is to provision processing, storage, networks, and other fundamental computing resources where the consumer is able to deploy and run arbitrary software, which can include operating systems and software applications. The consumer does not manage or control the underlying cloud infrastructure but has control over operating systems, storage, deployed software applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and software application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more software application programs, other program processes, and program data. One or more program 40 including program processes 42 can generally carry out the functions set forth herein. In one embodiment, orchestrator 110 can include one or more computing node 10 and can include one or more program 40 for performing functions described with reference to orchestrator 110 as set forth in the flowchart of FIG. 2. In one embodiment, one or more computing environments 120A-120Z can include one or more computing node 10, e.g., of manager node 121 and can include one or more program 40 for performing functions described with reference to one or more client computer device 130A-130Z as set forth in the flowchart of FIG. 2. In one embodiment, orchestrator 110 and/or a manager node 121 can include one or more computing node 10 and can include one or more program 40 for performing functions described with reference to the flowcharts of FIGS. 6A-6D, and FIG. 7 and FIG. 8. In one embodiment, the computing node based systems and devices depicted in FIGS. 1A and 1B can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network software application server software 67 and database software 68.

Virtualization layer 70 provides an abstraction layer from which the following examples of virtual entities may be provided: virtual servers 71; virtual storage 72; virtual networks 73, including virtual private networks; virtual software applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise software application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for adjusting software application performance impacting parameter values set forth herein. The processing components 96 can be implemented with use of one or more program 40 described in FIG. 9.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical software application, and to enable others of ordinary skill in the art to understand one or more aspects as described herein for various embodiments with various modifications as are suited to the particular use contemplated.

What is claimed is:

1. A computer implemented method comprising:

testing a software application having instances that run on (a) a test computing environment and (b) a target computing environment, wherein each of the test computing environment and the target computing environment is provided by a mobile access edge computing (MEC) environment, wherein the testing includes varying a software application performance impacting parameter value impacting performance of an instance of the software application running on the test computing environment, and examining metrics data resulting from the varying the software application performance impacting parameter value;

providing, in dependence on the metrics data, an action decision to adjust a software application performance impacting parameter value impacting performance of a software application instance of the software application running on the target computing environment; and adjusting the software application performance impacting parameter value impacting performance of the software application instance of the software application running on the target computing environment in accordance with the action decision, wherein the method includes selecting the test computing environment from a set of candidate computing environments, the selecting being performed using cluster analysis processing to ascertain a similarity level between the target computing environment and respective ones of the candidate computing environments.

2. A system comprising:

a memory;

at least one processor in communication with the memory; and program instructions executable by one or more processor via the memory to perform a method comprising:

testing a software application having instances that run on (a) a test computing environment and (b) a target computing environment, wherein each of the test computing environment and the target computing environment is provided by a mobile access edge computing (MEC) environment, wherein the testing includes varying a software application performance impacting parameter value impacting performance of an instance of the software application running on the test computing environment, and examining metrics data resulting from the varying the software application performance impacting parameter value;

providing, in dependence on the metrics data, an action decision to adjust a software application performance impacting parameter value impacting performance of a software application instance of the software application running on the target computing environment; and adjusting the software application performance impacting parameter value impacting performance of the software application instance of the software application running on the target computing environment in accordance with the action decision.

3. A computer implemented method comprising:

testing a software application having instances that run on (a) a test computing environment and (b) a target computing environment, wherein each of the test computing environment and the target computing environment is provided by a mobile access edge computing (MEC) environment, wherein the testing includes varying a software application performance impacting parameter value impacting performance of an instance of the software application running on the test computing environment, and examining metrics data resulting from the varying the software application performance impacting parameter value;

providing, in dependence on the metrics data, an action decision to adjust a software application performance impacting parameter value impacting performance of a software application instance of the software application running on the target computing environment; and adjusting the software application performance impacting parameter value impacting performance of the software application instance of the software application running on the target computing environment in accordance with the action decision.

4. The computer implemented method of claim 3, wherein the action decision is further provided in dependence on a cost analysis.

5. The computer implemented method of claim 3, wherein the method includes selecting the test computing environment from a set of candidate computing environments, the selecting being performed using processing to ascertain a similarity level between the target computing environment and respective ones of the candidate computing environments.

6. The computer implemented method of claim 3, wherein the method includes predicting future computing environment characterizing parameter values characterizing future performance of the target computing environment, and selecting the test computing environment from a set of candidate computing environments in dependence on the predicting.

7. The computer implemented method of claim 3, wherein the method includes predicting future performance of the target computing environment, and comparing parameter values defining the predicted future performance of the target computing environment to parameter values defining current performance of a set of candidate computing environments, and selecting the test computing environment from the set of candidate computing environments in dependence on the comparing.

8. The computer implemented method of claim 3, wherein the method includes predicting future computing environment characterizing parameter values characterizing future performance of the target computing environment, and comparing the predicted future computing environment characterizing parameter values to current computing characterizing parameter values characterizing current performance of a set of candidate computing environments, and selecting the test computing environment from the set of candidate computing environments in dependence on the comparing, wherein the predicting future computing environment characterizing parameter values characterizing future performance of the target computing environment includes querying, with query data, a predictive model trained with machine learning training data for predicting future performance of the target computing environment, the query data specifying future time of day parameter value.

9. The computer implemented method of claim 3, wherein the method includes predicting future computing environment characterizing parameter values characterizing future performance of the target computing environment, and comparing the predicted future computing environment characterizing parameter values to current computing characterizing parameter values characterizing current performance of a set of candidate computing environments, and selecting the test computing environment from the set of candidate computing environments in dependence on the comparing, wherein the predicting future computing environment characterizing parameter values characterizing future performance of the target computing environment includes querying, with query data, a predictive model trained with machine learning training data for predicting future performance of the target computing environment, the query data specifying a predicted future weather parameter value.

10. The computer implemented method of claim 3, wherein the method includes predicting future computing environment characterizing parameter values characterizing future performance of the target computing environment, and comparing the predicted future computing environment characterizing parameter values to current computing characterizing parameter values characterizing current performance of a set of candidate computing environments, and selecting the test computing environment from the set of candidate computing environments in dependence on the comparing, wherein the predicting future computing environment characterizing parameter values characterizing future performance of the target computing environment includes querying, with query data, a predictive model trained with machine learning training data for predicting future performance of the target computing environment, the query data specifying a scheduled social event parameter value.

11. The computer implemented method of claim 3, wherein the testing includes varying a plurality of software application performance impacting parameter values impacting performance of an instance of the software application running on the test computing environment, and examining metrics data resulting from the varying the plurality of software application performance impacting parameter values, wherein the software application performance impacting parameter values include (a) a software application performance impacting parameter value specifying adjustment of a resource provisioning configuration of a virtual machine, (b) a software application performance impacting parameter value specifying adjustment of a network capacity, and (c) a software application performance impacting parameter value specifying rehosting of a software application on a new virtual machine.

12. The computer implemented method of claim 3, wherein the metrics data includes metrics data specifying satisfaction level of users of the test computing environment.

13. The computer implemented method of claim 3, wherein the metrics data includes metrics data specifying satisfaction level of users of the test computing environment, wherein determining a satisfaction level of a certain user of the users includes monitoring throughput of a network connection associated to the certain user.

14. The computer implemented method of claim 3, wherein the method further comprises selecting the test computing environment from a set of candidate computing environments, the selecting being performed using cluster analysis processing to ascertain a similarity level between the target computing environment and respective ones of the candidate computing environments; varying one or more software application performance impacting parameter values impacting performance of an instance of the software application running on the test computing environment, the one or more software application performance impacting parameter values including (a) a parameter value specifying adjustment of a resource provisioning configuration of a virtual machine, (b) a parameter value specifying adjustment of a network capacity, and (c) a parameter value specifying rehosting of the software application on a new virtual machine; and examining metrics data resulting from varying the one or more software application performance impacting parameter values, the metrics data including metrics specifying satisfaction level of users of the test computing environment, wherein determining a satisfaction level of a certain user of the users includes monitoring throughput of a network connection associated to the certain user; predicting future computing environment characterizing parameter values characterizing future performance of the target computing environment; comparing the predicted future computing environment characterizing parameter values to current computing characterizing parameter values characterizing current performance of the set of candidate computing environments; and selecting the test computing environment from the set of candidate computing environments in dependence on the comparing, wherein the predicting includes querying, with query data, a predictive model trained with machine learning training data for predicting future performance of the target computing environment, the query data specifying at least one of: a future time of day parameter value, a predicted future weather parameter value, or a scheduled social event parameter value; and wherein the action decision of claim 1 is further provided in dependence on a cost analysis.

15. The computer implemented method of claim 3, wherein the testing further comprises simulating network performance conditions within the test computing environment, the simulating including dynamically altering network latency characteristics to emulate varying network transport times experienced in mobile access edge computing environments, wherein performance metrics collected during the simulation enable identification of latency thresholds beyond which the software application performance becomes suboptimal.

16. The computer implemented method of claim 3, wherein the metrics data includes detailed energy consumption measurements associated with the execution of the software application instance on the test computing environment, the energy consumption metrics comprising tracked usage levels of power-related system resources including CPU activity, memory usage, and disk utilization over the duration of testing, the collected metrics being used to guide parameter adjustments that reduce power consumption without violating application service-level performance requirements.

17. The computer implemented method of claim 3, wherein the action decision is further determined in dependence on a calculated user experience score derived from metrics obtained during testing, the score being computed as a weighted combination of multiple observed attributes including application responsiveness, task completion latency, throughput consistency, and error rates, wherein the resulting user experience score is compared against a predefined threshold associated with acceptable user quality of experience.

18. The computer implemented method of claim 3, wherein the testing includes executing controlled load tests that simulate scaling user activity within the test computing environment, the load tests incrementally increasing simulated concurrent user sessions, each session executing behavior representative of real-world interaction patterns, and wherein performance metrics collected include resource contention effects, system response degradation, and failure mode characteristics that indicate the application's performance limits under high concurrency.

19. The computer implemented method of claim 3, wherein the method further comprises executing an automated rollback mechanism in the target computing environment in response to the detection of performance degradation resulting from an applied adjustment, the rollback mechanism restoring a previously active configuration of the application instance from a state record, and triggering generation of diagnostic logs containing the adjustment that caused the degradation, performance measurements before and after the adjustment, and indicators for use in future performance model updates.

20. The computer implemented method of claim 3, wherein the metrics data further includes compliance-related telemetry indicative of the software application's adherence to a defined set of security policies during testing in the test computing environment, including detection of policy violations such as unauthorized access attempts, improper data exchanges, or untrusted execution behavior, and wherein any action decision that results in a configuration breaching said policies is automatically excluded from implementation.

21. The computer implemented method of claim 3, wherein the testing further comprises initiating a network emulation mode within the test computing environment to artificially vary one or more transport characteristics of a network layer, including latency, jitter, and packet delivery rate, in order to evaluate the sensitivity of the software application to edge-like connectivity conditions; and wherein metrics collected during said testing include resource consumption indicators that reflect power usage associated with processing tasks executed under variable network conditions, the indicators comprising tracked consumption of compute, memory, and storage resources to inform performance-impacting parameter adjustments that optimize for both responsiveness and energy efficiency.

* * * * *